US007277973B2

(12) United States Patent
Bando

(10) Patent No.: US 7,277,973 B2
(45) Date of Patent: Oct. 2, 2007

(54) INTERFACE APPARATUS

(75) Inventor: Hideaki Bando, Tokyo (JP)

(73) Assignee: Sony Corporation (JP)

(*) Notice: Subject to any disclaimer, the term of this patent is extended or adjusted under 35 U.S.C. 154(b) by 138 days.

(21) Appl. No.: 10/381,311

(22) PCT Filed: Jun. 27, 2002

(86) PCT No.: PCT/JP02/06496

§ 371 (c)(1),
(2), (4) Date: Mar. 24, 2003

(87) PCT Pub. No.: WO03/010939

PCT Pub. Date: Feb. 6, 2003

(65) Prior Publication Data

US 2004/0006654 A1 Jan. 8, 2004

(30) Foreign Application Priority Data

Jul. 25, 2001 (JP) ............................. 2001-225052

(51) Int. Cl.
*G06F 13/10* (2006.01)
*G06F 13/12* (2006.01)
*G06F 13/20* (2006.01)
*G06F 13/36* (2006.01)
(52) U.S. Cl. .................... 710/305; 710/301; 710/104
(58) Field of Classification Search .............. 710/100, 710/105–108, 300–301, 305; 326/28, 31, 326/56–58, 82–98; 310/229–230, 462–463
See application file for complete search history.

(56) References Cited

U.S. PATENT DOCUMENTS

| 4,847,867 | A | * | 7/1989 | Nasu et al. ................... 375/257 |
| 5,086,427 | A | * | 2/1992 | Whittaker et al. ........... 370/462 |
| 5,251,305 | A | * | 10/1993 | Murphy et al. .............. 713/501 |
| 5,594,680 | A | * | 1/1997 | Ohtake et al. ................ 365/63 |
| 5,646,553 | A | * | 7/1997 | Mitchell et al. ............... 326/86 |
| 5,648,733 | A | * | 7/1997 | Worrell et al. ................ 326/86 |
| 5,767,701 | A | * | 6/1998 | Choy et al. ................... 326/93 |
| 5,789,944 | A | * | 8/1998 | Choy et al. ................... 326/82 |

(Continued)

FOREIGN PATENT DOCUMENTS

DE          42 05 054          9/1992

(Continued)

OTHER PUBLICATIONS

Anderson, Shanley, "Cardbus System Architecture", 1996 Mindshare Inc. pp. 59-77, 99-100, 3789-379.

*Primary Examiner*—Paul R. Myers
*Assistant Examiner*—Ryan M Stiglic
(74) *Attorney, Agent, or Firm*—Lerner, David, Littenberg, Krumholz & Mentlik, LLP

(57) ABSTRACT

A memory card (1) is provided with data terminals (DATA0/SDIO, DATA1, DATA2, DATA3) for making two-way communication of 4-bit parallel data with a host apparatus on four data communication lines, a clock terminal (SCLK) for receiving a clock from the host apparatus, and a terminal (BS) for receiving, from the host apparatus, a bus-state signal indicating the states of the 4-bit parallel data communication lines and transfer start timing. The first data terminal (DATA0/SDIO) is used as a data terminal for a memory card intended for 1-bit data communication to maintain the compatibility with this memory card.

23 Claims, 24 Drawing Sheets

U.S. PATENT DOCUMENTS

| | | |
|---|---|---|
| 5,966,723 A | 10/1999 | James et al. |
| 6,253,259 B1* | 6/2001 | Hirabayashi et al. ........... 710/5 |
| 6,412,023 B1 | 6/2002 | Hirabayashi et al. |
| 2001/0009505 A1* | 7/2001 | Nishizawa et al. ......... 361/737 |
| 2001/0021956 A1* | 9/2001 | Okamoto et al. ........... 710/102 |
| 2001/0044870 A1 | 11/2001 | Fisher et al. |
| 2002/0099877 A1 | 7/2002 | Hirabayashi et al. |
| 2004/0030808 A1* | 2/2004 | Okaue et al. .................. 710/3 |

FOREIGN PATENT DOCUMENTS

| | | |
|---|---|---|
| EP | 0 962 868 | 12/1999 |
| EP | 0 969 480 | 1/2000 |
| EP | 1 047 016 A1 | 10/2000 |
| JP | 59-161957 A1 | 9/1984 |
| JP | 60-51046 A1 | 3/1985 |
| JP | 8-202653 A1 | 8/1996 |
| JP | 11-53306 A1 | 2/1999 |
| JP | 2000-259783 A1 | 9/2000 |
| JP | 2001-5943 A1 | 1/2001 |
| WO | WO-99/49415 | 9/1999 |

* cited by examiner

| No. | Terminal name | I/O | Function |
|---|---|---|---|
| 1 | VSS | | Vss |
| 2 | BS | I | Bus state signal |
| 3 | VCC | I | Vcc |
| 4 | SDIO | I/O | Data signal |
| 5 | Reserved | | Auxiliary |
| 6 | INS | O | Card detect terminal |
| 7 | Reserved | | Auxiliary |
| 8 | SCLK | I | Clock signal |
| 9 | VCC | I | Vcc |
| 10 | VSS | | Vss |

| No. | Terminal name | I/O | Function(serial) | Function(parallel) |
|---|---|---|---|---|
| 1 | VSS | | Vss | |
| 2 | BS | I | Bus state signal | |
| 3 | DATA1 | I/O | Hi-Z | Data signal 1 |
| 4 | SDIO/DATA0 | I/O | Data signal | Data signal 0 |
| 5 | DATA2 | I/O | Hi-Z | Data signal 2 |
| 6 | INS | O | Card detect terminal | |
| 7 | DATA3 | I/O | Hi-Z | Data signal 3 |
| 8 | SCLK | I | Clock signal | |
| 9 | VCC | I | Vcc | |
| 10 | VSS | | Vss | |

| State | Bus state | Description |
|---|---|---|
| BS0 | Low | INT Transfer State:<br>No packet communication is done; interface is usable for transfer of INT(interrupt signal) |
| BS1 | High | TPC State<br>Indicates that packet communication can be started; TPC(transfer protocol command) is transferred from host to memory card |
| BS2 | Low | Read protocol<br>Handshaking:<br>Waiting for RDY signal | Write protocol<br>Data is transferred to memory card |
| BS3 | High | Read protocol<br>Handshaking:<br>Data is read from memory card | Write protocol<br>Handshaking:<br>Waiting for RDY signal |

FIG.17

INTERFACE APPARATUS

BACKGROUND OF THE INVENTION

1. Technical Field

The present invention relates to a device for providing an interface between a host apparatus and a removable externally connected apparatus.

2. Background Art

There has been available a removable IC memory device known as "memory card".

The memory card incorporates a nonvolatile semiconductor memory (IC memory) and can store various digital data including still picture data, moving picture data, audio data, music data, etc. The memory card is usable as an external storage medium with a host apparatus such as a portable digital assistant, desk-top computer, notebook computer, mobile phone, audio apparatus, home electric appliances or the like.

Some conventional memory cards use, for data transfer to and from a host apparatus, a three-wire half-duplex serial protocol intended for transfer of three signals including a 1-bit serial data, clock signal and bust-state signal.

The serial data signal is data signal for transfer between a memory card and host apparatus and memory card. The serial data signal varies in transfer direction and attribute thereof according to a statement defined by the bus-state signal.

The bus-state signal is a signal for defining the state of the serial data signal and a timing of starting the transfer of a serial data signal in each state.

The clock signal is a clock for the serial data and bus-state signals to be transferred over a bus. It is transferred from the host apparatus to the memory card. A clock signal is outputted whenever a packet communication which will be described in detail later is in any of three states (BS1 to BS3).

Typical memory cards adopting the above-mentioned three-wire half-duplex serial protocol are known from the disclosures in the Applicant's Japanese Unexamined Application Publication No. 53306 of 1999 and U.S. Pat. No. 6,253,259.

The memory cards disclosed in the above references will be described herebelow as conventional memory cards.

FIG. 1 shows the conventional memory card in the form of a schematic plan view and the terminal block of the memory card in an enlarged scale. As in the plan view in FIG. 1, the conventional memory card is indicated with a reference 500. It is formed like a card having a terminal block including ten terminals or pins 1 to 10.

The pins 1 and 10 are ground (VSS) terminals. The pin 2 is a BS terminal for reception of a bus-state signal from a host apparatus. The pins 3 and 9 are source voltage (VCC) terminals. The pin 4 is an input/output (SDIO) terminal for a serial data signal which is transferred between the memory card and host apparatus. The pins 5 and 7 are auxiliary (reserved) terminals. The pin 6 is a card detection (INS) terminal of which the existence is detected by the host apparatus to determine whether the memory card is inserted in the card slot or not. The pin 8 is a clock (SCLK) terminal reception of a clock signal from the host apparatus.

FIG. 2 shows an example construction of a front-end device of an interface between a conventional memory card 500 and a host apparatus 600.

As shown, the conventional memory card 500 includes a data input buffer 501R, data output buffer 501S, BS input buffer 505 and a CLK input buffer 506.

The above data input buffer 501R and data output buffer 501S are provided as an input/output driver for the SDIO terminal. Also, the BS input buffer 505 is provided as an input driver for the BS terminal. Further, the CLK input buffer 506 is provided as an input driver for the SCLK terminal.

Note here that the data output buffer 501S is a so-called tri-state buffer. In the memory card, since it makes a two-way data communication on one line, so the output driver not used has to be at a high impedance at the output thereof for the memory card to be supplied with data. Thus, the tri-state buffer is used as the data output buffer 501S working as a data output driver. The data output buffer 501S is supplied with an enable signal DE2, as a control signal, from a controller or the like (not shown). When the enable signal DE2 is High, the data output buffer 501S will have a high impedance at the output thereof. On the contrary, when the enable signal DE2 is Low, the data output buffer 501S will have the output thereof enabled.

The memory card 500 further includes a data input flip-flop 511R, data output flip-flop 511S and a BS input flip-flop 515.

The data input flip-flop 511R and data output flip-flop 511S are provided as a latch circuit for input/output data at the SDIO terminal. The BS input flip-flop 515 is provided as a latch circuit for input data at the BS terminal.

The data input flip-flop 511R is supplied with data from the data input buffer 501R and outputs data to the controller or the like (not shown). The data output flip-flop 511S is supplied with data from the controller or the like (not shown) and outputs data to the data output buffer 501S. The BS input flip-flop 515 is supplied with data from the BS input buffer 505 and outputs data to the controller or the like (not shown).

Also, each of the above flip-flops is supplied with a clock signal from the SCLK terminal.

Note here that each of the data input flip-flop 511R and BS input flip-flop 515 latches data synchronously with a timing of the leading edge of the clock signal. On the other hand, the data output flip-flop 511S latches data synchronously with a timing of the trailing edge of the clock signal.

The host apparatus 600 includes a data input buffer 601R, data output buffer 601S, BS output buffer 605 and a CLK output buffer 606.

The data input buffer 601R and data output buffer 601S are provided as an input/output driver for the SDIO terminal. The BS output buffer 605 is provided as an output driver for the BS terminal. The CLK output buffer 606 is provided as an output driver for the SCLK terminal.

Note that the data output buffer 601S is a so-called tri-state buffer. The reason why the data output buffer 601S is a tri-state buffer is similar to that for which the data output buffer 601S in the memory card is a tri-state buffer. The data output buffer 601S is supplied with an enable signal DE1, as a control signal.

When the enable signal DE1 is High, the data output buffer 601S will have a high impedance at the output thereof. On the contrary, when the enable signal DE1 is Low, the data output buffer 601S will have the output thereof enabled. The enable signal DE1 is supplied from the controller or the like (not shown).

The host apparatus 600 further includes a data input flip-flop 611R, data output flip-flop 611S, BS output flip-flop 615 and a clock generator 616.

The data input flip-flop 611R and data output flip-flop 611S are provided as a latch circuit for input/output data at the SDIO terminal. The BS output flip-flop 615 is provided as a latch circuit for output data at the BS terminal.

The clock generator 616 generates a clock signal having a predetermined frequency (20 MHz at maximum, for example).

The data input flip-flop 611R is supplied with data from the data input buffer 601R and outputs data to the controller or the like (not shown). The data output flip-flop 611S is supplied with data from the controller or the like (not shown) and outputs data to the data output buffer 601S. The BS output flip-flop 615 is supplied with data from the controller or the like (not shown) and outputs data to the BS output buffer 605.

Also, each of the above flip-flops is supplied with a clock signal from the clock generator 616.

Note here that each of the data input flip-flop 611R, data output flip-flop 611S and BS output flip-flop 615 latches data synchronously with a timing of the trailing edge of the clock signal.

The front-end circuit constructed as above operates to transmit data from the host apparatus 600 to the memory card 500 as will be described below.

First, the enable signal DE1 in the host apparatus 600 is Low while the enable signal DE2 in the memory card 500 is High. In this case, the host-side data output buffer 601S has the output thereof enabled while the card-side data output buffer 501S has a high impedance at the output thereof. Thus, the serial data (SDIO) will be transmitted from the host apparatus 600 to the memory card 500.

The serial data signal is outputted from the host-side data output flip-flop 611S synchronously with the trailing edge of the clock signal. The serial data signal output from the data output flip-flop 611S is supplied to the card-side data input flip-flop 511R via the data output buffer 601S, pin 4 and data input buffer 501R. The serial data signal is supplied to the card-side data input flip-flop 511R synchronously with the leading edge of the clock signal.

Next, the data transmission from the memory card 500 to the host apparatus 600 will be described.

First, the enable signal DE1 in the host apparatus 600 is High while the enable signal DE2 in the memory card 500 is Low. In this case, the host-side data output buffer 601S has a high impedance at the output thereof while the card-side data output buffer 501S has the output thereof enabled. Thus, the serial data (SDIO) will be transmitted from the memory card 500 to the host apparatus 600.

The serial data signal is outputted from the card-side data output flip-flop 511S synchronously with the trailing edge of the clock signal. The serial data signal output from the data output flip-flop 511S is supplied to the host-side data input flip-flop 611R via the data output buffer 501S, pin 4 and data input buffer 601R. The serial data signal is supplied to the host-side data input flip-flop 611R synchronously with the leading edge of the clock signal.

Note that the bus-state signal is transmitted from the host apparatus 600 to the memory card 500. That is, in this interface, the host apparatus 600 will have the initiative of the data communication.

The bus-state signal is outputted from the host-side BS output flip-flop 615 synchronously with the trailing edge of the clock signal. The bus-state signal output from the BS output flip-flop 615 is supplied to the card-side input flip-flop 515 via the BS output buffer 605, pin 2 and BS input buffer 505. The bus-state signal is supplied to the card-side BS input flip-flip 515 synchronously with the leading edge of the clock signal.

The above clock signal is generated by the clock generator 616 and supplied to each of the flip-flops in the host apparatus 600. Also, the clock signal is supplied to each of the flip-flops in the memory card 500 via the CLK output buffer 606, pin 8 and CLK input buffer 506.

Next, the content of communication by the convention memory card will be described.

In the interface of the conventional memory card, the attribute and direction of the serial data signal are defined by switching the bus-state signal. The state includes four categories: BS0 being a state in which no packet communication is done and BS1 to BS3 in which a packet communication is done. The bus-state signal has the state thereof sequentially switched from BS0 to BS3 by selection of a signal level between High and Low.

Also, the attribute and direction of data in each of the states vary between a read protocol intended for data transfer from the memory card to the host apparatus and a write protocol for data transfer from the host apparatus to the memory card. Also, in the interface of the conventional memory card, the states BS1 to BS3 are taken as one packet for management of the data transmission. That is, the data transfer from the host apparatus to the memory card is managed as "write packet" and that from the memory card to the host apparatus is managed as "read packet".

The content of communication in each state will be detailed below.

FIG. 3 shows the content of write-packet communication, and FIG. 4 shows the content of read-packet communication.

The state BS0 is a state in which an interrupt (INT) signal can be transferred from the memory card to the host apparatus.

The BS1 is a state in which a TPC (transfer protocol command) command is transferred. The TPC command is a control command transferred from the host apparatus to the memory card.

In the data communication in the state BS2 or BS3, the attribute of serial data signal varies between the read and write packets.

In the data communication in the state BS2, a busy (BSY) signal and ready signal are transferred from the memory card to the host apparatus. More specifically, in the data communication in this state BS2, the busy signal is sent from the memory card to the host apparatus when the memory card is not ready for any data transfer. When the memory card is ready for the data transfer, the ready signal is sent from the memory card to the host apparatus.

In the data communication in the state BS2, data to be written is transferred from the host apparatus to the memory card according to the write protocol.

In the data communication in the state BS3, data to be read is transferred from the memory card to the host apparatus according to the read protocol.

In the data communication in the state BS3, the busy and ready signals are transferred from the memory card to the host apparatus according to write protocol. In this data communication in the state BS3, when the procedure for data transfer from the host apparatus to the memory card is not complete, the busy signal is sent from the memory card. When the procedure is complete, the ready signal is sent from the memory card.

Note here that the aforementioned conventional memory card makes a serial transmission with a transfer clock of 20 MHz at maximum. Therefore, the maximum data transfer rate is 20 Mbps. Recently, however, the flash memory used in the memory card has an increased capacity and a higher write/read speed. In this circumstance, a memory card is demanded which has a higher data transfer rate.

Further, the memory card demanded to have a higher data transfer rate as above should be interchangeable with the conventional memory card.

Also, the conventional memory card should be able to detect a bus-state signal transferred from the host apparatus synchronously with the leading edge of a clock signal and send data synchronously with the trailing edge of the clock signal as above.

For the above purpose, the conventional memory card should be able to detect switching of the bus-state signal at the leading edge (T101) of the clock signal and start sending data at a trailing edge (T102) next to the leading edge as shown in FIG. 5, for example. Thus, an operation responsive to the BS switching has to be done in a half period of the clock signal. Therefore, in the conventional memory card, the data transfer rate depends upon a time (25 nsec at minimum) being a half of the period of the clock signal, not upon the actual period (50 nsec at maximum) of the clock signal, which will restrict the increase of the data transfer rate.

Also, in the conventional memory card, since one data line is used in the two-way data communication, so a state is defined by a bus-state signal to determine a direction of data transmission. Thus, the direction of data transfer is switched according to the switching of the bus-state signal. For example, when the state is switched from BS0 to BS1 and from BS2 to BS3 in the write-packet communication or when the state is switched from BS0 to BS1 and from BS1 to BS2 in the read-packet communication, the direction of data transfer is switched.

In the conventional memory card, the host-side enable signal DE1 and card-side enable signal DE2 are changed in level in response to the switching of the bus-state signal to accommodate the switched data transfer direction.

However, the signal level has to be changed synchronously with the first trailing edge after the bus-state signal is sent. Thus, the host-side enable signal DE1 and card-side enable signal DE2 are changed in level nearly at the same time. Thus, when either of the enable signals is changed not synchronously with the trailing edge with the results of the enable signal DE1 being Low in level and the enable signal DE2 being Low, for example, that is to say, when both the host-side and card-side output drivers are enabled, the data buses will conflict with each other. To avoid such a conflict between the data buses, the conventional memory card has to be designed for the enable signals DE1 and DE2 to be changed strictly synchronously with the trailing signal of the clocks signal.

SUMMARY OF THE INVENTION

Accordingly, the present invention has an object to overcome the above-mentioned drawbacks of the related art by providing an interface device which provides a higher data transfer rate than in the conventional serial communication made with a 1-bit serial data, clock and bus-state signal.

The present invention has another object to provide an interface device which provides a higher data transfer rate while maintaining the compatibility with the conventional serial communication made with a 1-bit serial data, clock and bus-state signal.

The present invention has still another object to provide an interface device capable of preventing data buses from conflicting with each other.

The present invention has yet another object to provide an interface device which uses a faster clock for a higher data transfer rate.

The above object can be attained by providing an interface device for an external device removably installable to a host apparatus, the device including according to the present invention:

a data communication means for making two-way communication of 4-bit parallel data with the host apparatus over four data communication lines;

a clock reception means for receiving a clock for the 4-bit parallel data from the host apparatus;

a bus-state signal reception means for receiving, from the host apparatus, a bus-state signal indicating the states of the 4-bit parallel data communication lines and transfer start timing; and a control means for controlling the direction of transmitting the 4-bit parallel data according to the content of a command received from the host apparatus and states, indicated by the bus-state signal, of the data communication lines.

In the above interface device according to the present invention, the control means opens, for input of the 4-bit parallel data, the output of a data output driver provided for each of the four data communication lines and enables, for switching the input of the 4-bit parallel data to the output thereof, the output of a data output driver of the external device after the output of a data output driver of the host apparatus has been opened for more then one clock.

Also in the above interface device according to the present invention, the data communication means and bus-state signal reception means are enabled synchronously with either the leading or trailing edge of the clock.

Also the above object can be attained by providing an interface device for a host apparatus to which an external apparatus is removably installable, the device including according to the present invention:

a data communication means for making two-way communication of 4-bit parallel data with the host apparatus over four data communication lines;

a clock sending means for sending a clock for the 4-bit parallel data to the external device;

a bus-state signal sending means for sending, to the external device, a bus-state signal indicating the states of the 4-bit parallel data communication lines and transfer start timing; and a control means for controlling the direction of transmitting the 4-bit parallel data according to the content of a command sent to the external device and states, indicated by the bus-state signal, of the data communication lines.

In the above interface device according to the present invention, the control means opens, for input of the 4-bit parallel data, the output of a data output driver provided for each of the four data communication lines and enables, for switching the input of the 4-bit parallel data to the output thereof, the output of a data output driver of the host apparatus after the output of a data output driver provided in the external apparatus has been opened for more then one clock.

Also in the above interface device according to the present invention, the data communication means and bus-state signal reception means are enabled synchronously with either the leading or trailing edge of the clock.

Also the above object can be attained by providing an interface device for an external device removably installable to a host apparatus, the device including according to the present invention:

a serial data communication means for making two-way communication of 1-bit serial data with the host apparatus over one data communication line;

a data communication means for making two-way communication of 4-bit parallel data with the host apparatus over four data communication lines;

a clock reception means for receiving a clock for the 1-bit serial data or 4-bit parallel data from the host apparatus;

a bus-state signal reception means for receiving, from the host apparatus, a bus-state signal indicating the states of the 1-bit serial data or 4-bit parallel data communication lines and transfer start timing;

a control means for controlling the direction of transmitting the 1-bit serial data or 4-bit parallel data according to the content of a command received from the host apparatus and states, indicated by the bus-state signal, of the data communication lines; and a switching means for making a selection between the 1-bit serial and 4-bit parallel data communications;

the serial data communication means making communications with the host apparatus by sharing one of the four data communication lines over which the 4-bit parallel data is transferred.

Also the above object can be attained by providing an interface device for a host apparatus to which an external apparatus is removably installable, the device including according to the present invention:

a serial data communication means for making two-way communication of 1-bit serial data with the external apparatus over one data communication line;

a data communication means for making two-way communication of 4-bit parallel data with the host apparatus over four data communication lines;

a clock sending means for sending a clock for the 1-bit serial data or 4-bit parallel data from the external apparatus;

a bus-state signal sending means for sending, to the external apparatus, a bus-state signal indicating the states of the 1-bit serial data or 4-bit parallel data communication lines and transfer start timing;

a control means for controlling the direction of transmitting the 1-bit serial data or 4-bit parallel data according to the content of a command send to the external apparatus and states, indicated by the bus-state signal, of the data communication lines; and a switching means for making a selection between the 1-bit serial and 4-bit parallel data communications;

the serial data communication means making the 1-bit serial data communications by sharing one of the four data communication lines over which the 4-bit parallel data is transferred.

These objects and other objects, features and advantages of the present invention will become more apparent from the following detailed description of the best mode for carrying out the present invention when taken in conjunction with the accompanying drawings.

BRIEF DESCRIPTION OF THE DRAWINGS

FIG. 17 explains the content of communication in each state.

DETAILED DESCRIPTION

A small, removable IC memory and a data processing apparatus which uses the small IC memory as an external storage medium will be described below as embodiments of the present invention.

Note that the small IC memory which will be described as an embodiment of the present invention will be referred to as "memory card" hereunder. Also, the data processing apparatus using the memory card will be referred to as "host apparatus" hereunder.

Figure 6:
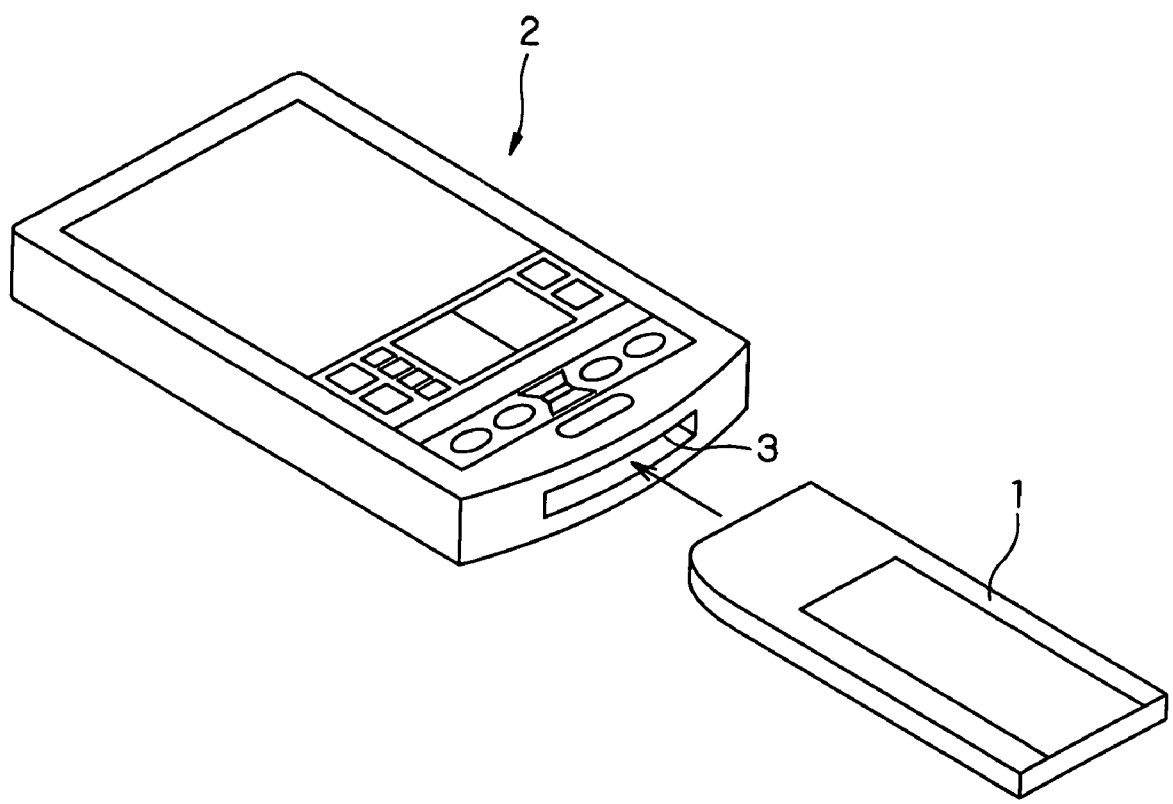
FIG. 6 is a perspective view of a host apparatus and memory card according to the present invention, showing the appearance of them.

Referring now to FIG. 6, there are schematically illustrated a host apparatus and memory card according to the present invention in the form of a perspective view showing the appearance of them.

The memory card is indicated with a reference 1, and it incorporates a nonvolatile semiconductor memory (IC memory) capable of various digital data including still picture data, moving picture data, audio data, music data, etc. The memory card 1 is usable as an external storage medium with a host apparatus (indicated with a reference 2 herein) such as a portable digital assistant, desk-top computer, notebook computer, mobile phone, audio apparatus, home electric appliances or the like. For use, the memory card 1 is inserted in a slot 3 formed in the host apparatus 2. The user can freely insert the memory card 1 into the slot 3 or remove it from the latter. Therefore, the memory card 1 can be removed from a host apparatus and inserted into another host apparatus, and thus it can be used for data transfer between different host apparatuses.

The data transfer between the memory card 1 and host apparatus 2 is made via a predetermined interface.

The interface of the memory card having previously been explained in the "Background Art" is a serial interface based on the three-wire half-duplex serial protocol for transfer of three signals including 1-bit serial data, clock signal and bus-state signal.

The memory card 1 and host apparatus 2 according to the present invention are capable of data transfer by the conventional interface based on the three-wire half-duplex serial protocol and also by a parallel interface based on a six-wire half-duplex parallel protocol for transfer of six signals including 4-bit parallel data, clock signal and bus-state signal. These interfaces will be described in detail later. Also, the memory card 1 according to the present invention is similar in mechanical shape to, and thus interchangeable, with the conventional memory card having previously been described in the "Background Art", and has connection terminals compatible with those of the conventional memory card.

Therefore, it should be noted that the memory card 1 according to the present invention is used in a host apparatus compatible only with the memory card having been described in the "Background Art". Also, it should be noted that the host apparatus 2 for the memory card 1 according to the present invention can use, as an external storage medium, the conventional memory card described in the "Background Art". That is, the memory card according to the present invention is interchangeable with the conventional memory card in the "Background Art".

The memory card according to the present invention will be described in detail herebelow in comparison with the conventional memory card in the "Background Art" wherever appropriate. It should be noted that for clear differential between the conventional memory card having previously been described in the "Background Art" and memory card according to the present invention, the conventional memory card and a host apparatus for the memory card will be referred to with an adjective phrase "type 1" while the memory card according to the present invention and a host apparatus for this memory card will be referred to with an adjective phrase "type 2".

Appearance

Figure 7:
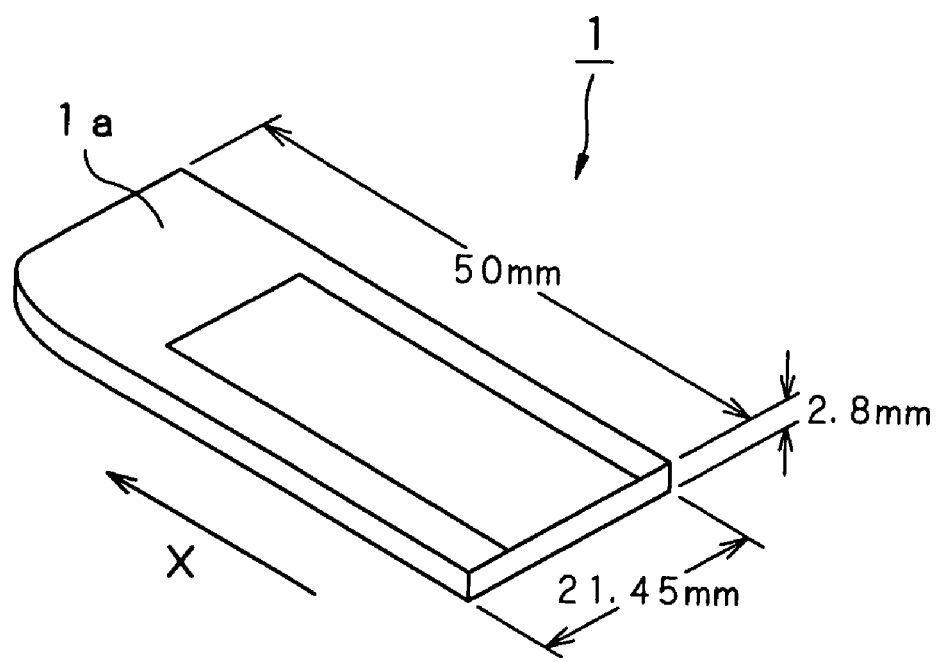
FIG. 7 is a perspective view, from front side, of the memory card in FIG. 1.
Figure 8:
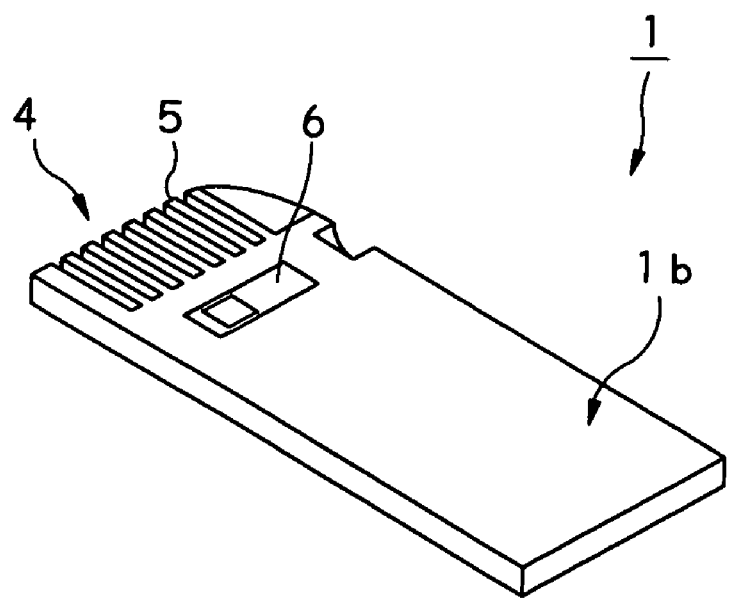
FIG. 8 is a perspective view, from rear side, of the memory card in FIG. 1.

FIG. 7 is a perspective view, from the front, of the memory card 1 according to the present invention and FIG. 8 is also a perspective view, from the rear, of the memory card 1.

As shown, the memory card 1 is formed like a thin plate having generally rectangular main sides (front side 1a and rear side 1b). In the memory card 1, each main side is about 50 mm long, about 21.45 mm wide and 2.8 mm thick. The main sides of the memory card 1 include the front side 1a and rear side 1b. The memory card 1 has ten flat electrodes (connection terminal group 4) provided in a line along the shorter edge at one longitudinal end thereof. A guard 5 rising vertically from the rear side 1b is provided in each space between the electrodes to prevent any touch with the electrode. Also, the memory card 1 has provided on the rear side 1b thereof a sliding switch 6 to prevent erroneous erasure.

The slot 3 provided in the host apparatus 2 is formed concave corresponding to the memory card 1 having the above shape, and the memory card 1 can be inserted into the slot 3. The memory card 1 inserted into the slot 3 can be held in the slot 3 not to come off. Also, the slot 3 has ten contacts in positions corresponding to the ten flat electrodes of the memory card 1. When the memory card 1 is introduced into the slot with the connection terminal group 4 first (in the direction of arrow X in FIG. 7), the connection terminals of the memory card 1 will be electrically connected with the respective contacts in the slot 3.

Note that the memory card 1 of the type 1 and slot 3 in the host apparatus of the type 1 are the same in shape as the memory card 1 of the type 2 and slot 3 in the host apparatus of the type 2. Namely, the memory card of the type 1 can be used with the host apparatus of the type 2, and the memory card of the type 2 can be used with the memory card of the type 1 because they are mechanically interchangeable with each other.

Electrical Functions of the Memory Card According to the Present Invention

Figure 9:
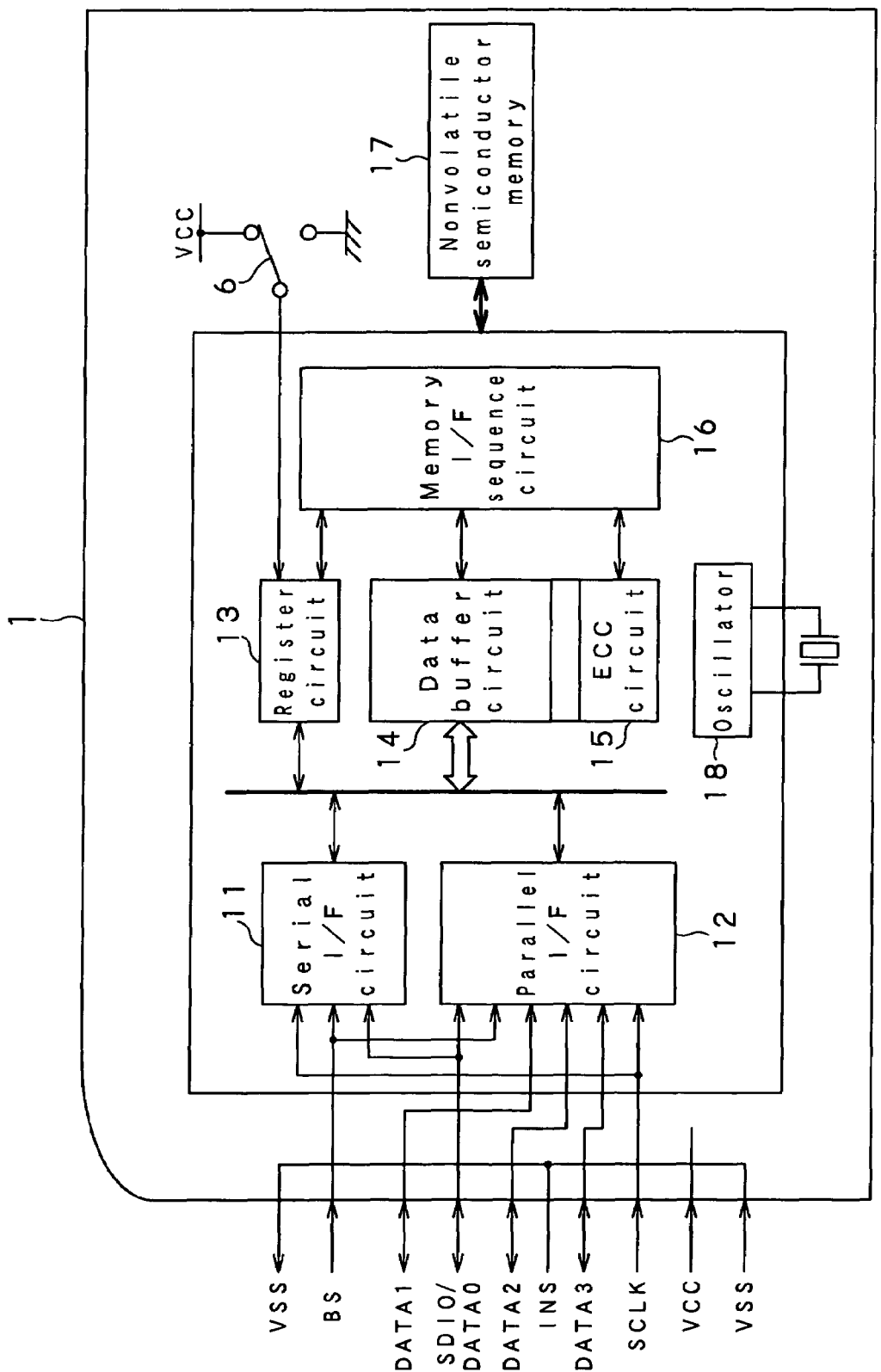
FIG. 9 is an internal block diagram of the memory card in FIG. 1.

FIG. 9 is an internal block diagram of the memory card

The memory card 1 is composed of a serial interface (I/F) circuit 11, parallel interface (I/F) circuit 12, register circuit 13, data buffer circuit 14, ECC circuit 15, memory I/F sequence circuit 16, nonvolatile semiconductor memory 17, and an oscillation control circuit 18.

The serial I/F circuit 11 makes data transfer to and from the host apparatus 2 according to the three-wire half-duplex serial protocol. The parallel I/F circuit 12 makes data transfer to and from the host apparatus 2 according to the six-wire half-duplex parallel protocol. Data transfer between the memory card 1 and host apparatus 2 is effected via only one of the serial I/F circuit 11 and parallel I/F circuit 12. For data transfer by the three-wire half-duplex serial protocol, the serial I/F circuit 11 is used, and for data transfer by the six-wire half-duplex parallel protocol, the parallel I/F circuit 12 is used. It should be noted that the serial I/F circuit 11 and parallel I/F circuit 12 are shown and explained separately but these two functions may be incorporated in a circuit designed to make a selection between the three-wire half-duplex protocol and six-wire half-duplex parallel protocol correspondingly to a setting in the register circuit 13.

The register circuit 13 stores, for example, a command transferred from the host apparatus, internal state of the memory card 1, address of data going to be accessed, various necessary parameters for execution of the command, file management information in the nonvolatile semiconductor memory 17, etc. The Information stored in the register circuit 13 is accessed from the memory I/F sequence circuit 16 or from the host apparatus 2 by supplying a predetermined command.

The data buffer circuit 14 temporarily stores or buffers data to be written to the nonvolatile semiconductor memory 17 and data read from the nonvolatile semiconductor memory 17. The data buffer 14 has a data storage capacity for a predetermined unit of data write (512 bytes, the same as a page size in the flash memory, for example).

The ECC circuit 15 adds an error correction code (ECC) to data going to be written to the nonvolatile semiconductor memory 17. Also, the EEC circuit 15 corrects an error, if any, of data read from the nonvolatile semiconductor memory 17 according to an error correction code (ECC) added to the data. For example, three bytes of error correction code are added to a data unit of 512 bytes.

The memory I/F sequence circuit 16 controls the transfer of data between the data buffer circuit 14 and nonvolatile semiconductor memory 17 according to a command and various kinds of information stored in the register circuit 13.

The nonvolatile semiconductor memory 17 is a flash memory, for example.

The oscillation control circuit 18 generates a clock for each operation in the memory circuit 1.

The memory card 1 constructed as above writes, reads, erases or otherwise processes data, for example, according to various commands supplied via an interface from the host apparatus 2.

For example, the memory card 1 stores, once into the data buffer circuit 14, data transferred from the serial or parallel I/F circuits from the host apparatus 2, adds ECC to the data and stores the data in an area of a predetermined address in the nonvolatile semiconductor memory 17. Also, the memory card 1 stores, into the data buffer circuit 14, data stored at a predetermined address in the nonvolatile semiconductor memory 17, corrects an error, if any, of the data in the data buffer circuit, and transfers the data to the host apparatus 2 via the serial or parallel interface circuit.

Terminals

Next, the functions of the connection terminals connecting the memory card and host apparatus to each other will be explained in comparison with the memory card of the type 1.

Figure 10:
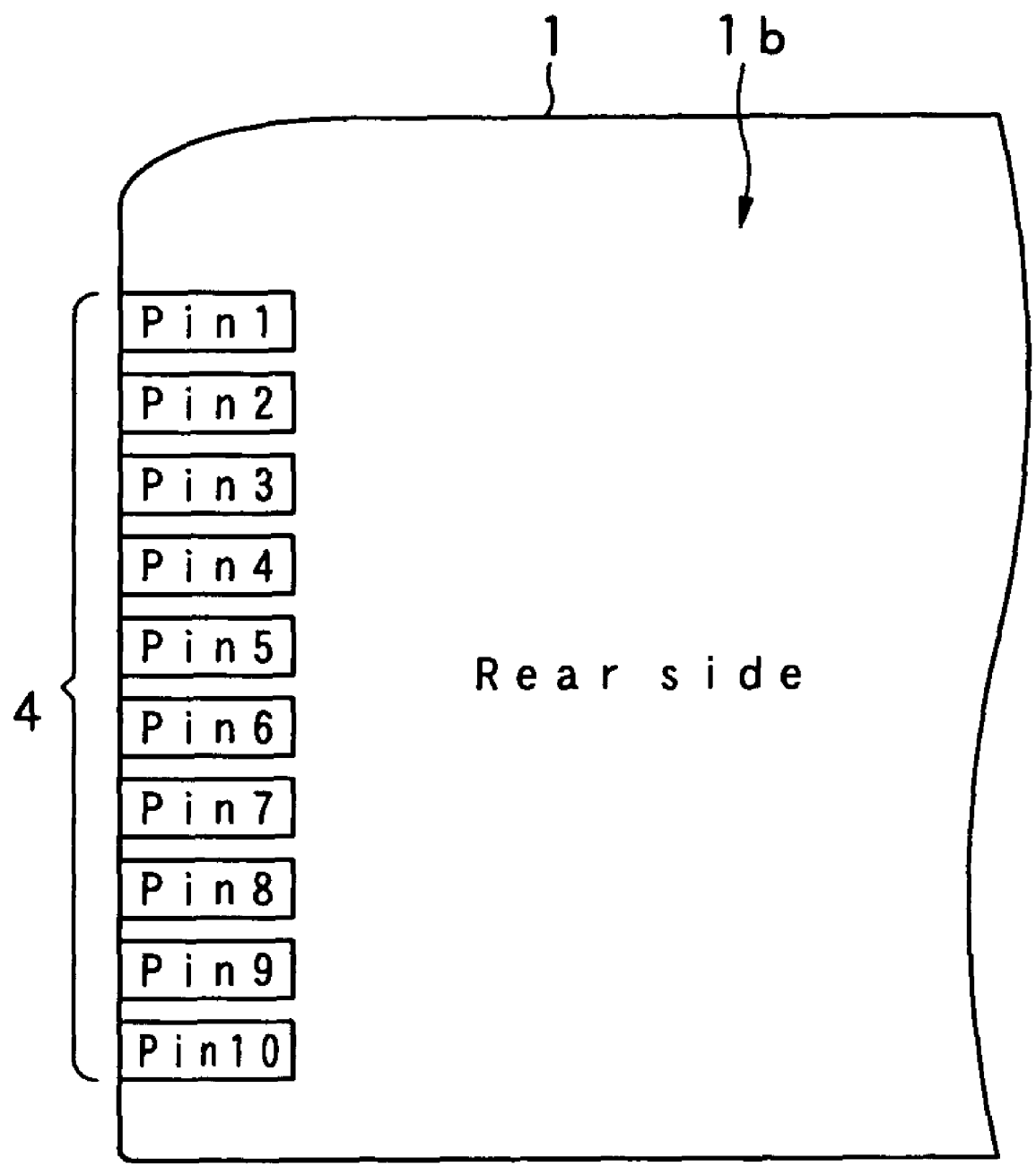
FIG. 10 explains the connection terminals of the memory card.

Note here that the connection terminals of the memory card will be numbered as shown in FIG. 10 for the convenience of the explanation and each of the ten terminals will be described herebelow. The ten connection terminals will be seen as shown in FIG. 10 when viewed from the rear side of the memory card laid with the connection terminal group 4 being located at the left side. The connection terminals are number as pin 1 to pin 10 in the order counted from above. It should be noted that only the card-side connection terminals will be described herein but the terminals (contacts), corresponding to these connection terminal (pins 1 to 10), of the host apparatus have functions similar to those of the memory card.

(Terminals of the Type-1 Memory Card)

First, the connection terminals of the type-1 memory card will be described.

Figures 11, 12:
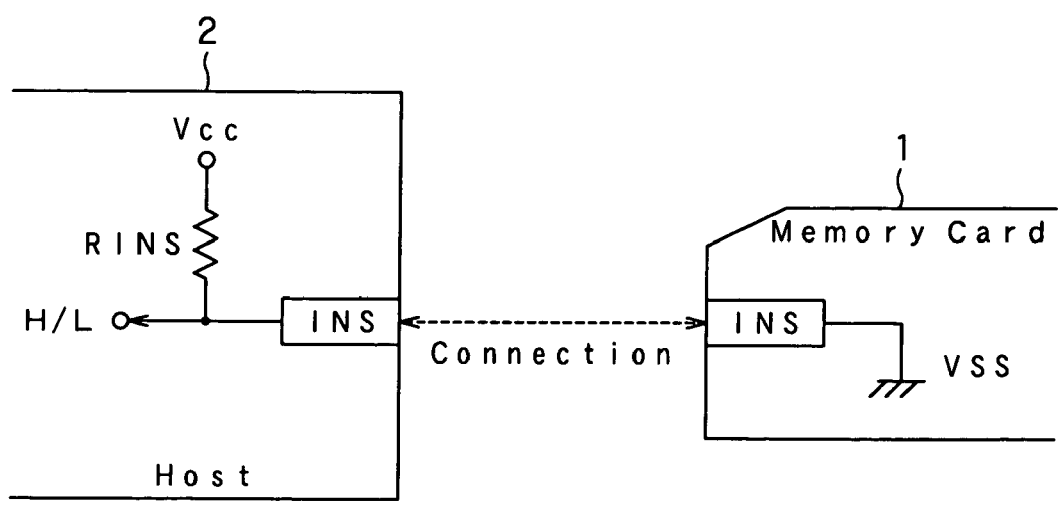
FIG. 11 explains the functions of the connection terminals of the type-1 conventional memory card (conventional).
FIG. 12 explains the card detecting function.

The connection terminals of the type-1 (conventional) memory card have the functions as listed in FIG. 11.

The pin 1 (VSS terminal) is applied with VSS (reference voltage of 0 V). This VSS terminal is connected to the ground of the host apparatus and that of the memory card so that the 0-V reference voltages to the host apparatus and memory card, respectively, are the same as each other.

The pin 2 (BS terminal) is supplied with a bus-state signal from the host apparatus. The bus-state signal will be described in detail later.

The pin 3 (VCC terminal) is applied with a source voltage (VCC) from the host apparatus. The source voltage with which the memory card is operable is 2.7 to 3.6 V, for example. A voltage in this range is applied to the pin 3.

The pin 4 (SDIO terminal) serves as an input/output terminal for a serial data signal for transfer between the memory card and host apparatus.

The pin 5 (reserved terminal) is an auxiliary terminal which has not any special function.

The pin 6 (INS terminal) is used for the host apparatus to determine whether the memory card is inserted in the slot of the host apparatus or not. More specifically, the INS terminal at the memory card is connected to the VSS terminal as shown in FIG. 12. On the other hand, the INS terminal at the host apparatus is pulled up to the source voltage VCC) via a resistor RINS. The host apparatus detects a voltage level at the INS terminal. Thus, when the memory card is inserted in the slot of the host apparatus 2, the detected voltage level will be Low. When no memory card is inserted in the slot of the host apparatus 2, the detected voltage level will be High. The host apparatus determines, by checking the voltage level at the INS terminal, whether the memory card is inserted in the slot of the host apparatus or not.

The pin 7 (reserved terminal) is also an auxiliary terminal having no special function.

The pin 8 (SCLK terminal) is supplied, from the host apparatus, with a clock signal for serial data transferred to or from the SDIO terminal.

The pin 9 (VCC terminal) is applied with a source voltage (VCC) from the host apparatus. The pin 9 is internally connected to the pin 3.

The pin 10 (VSS terminal) is applied with VSS (reference voltage). It is internally connected to the pin 1.

(Terminals of the Type-2 Memory Card)

Figures 13, 14:
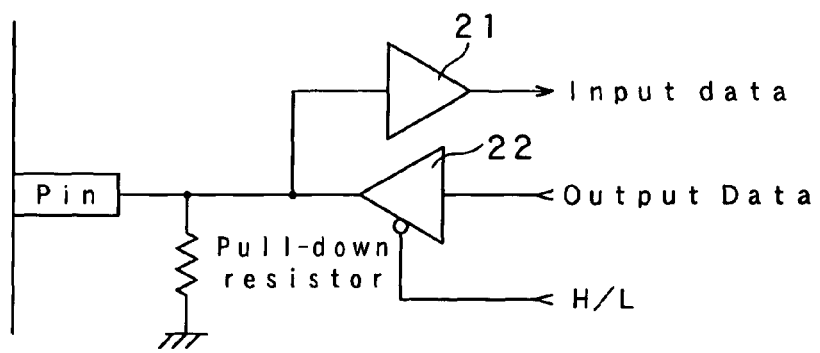
FIG. 13 explains the functions of the connection terminals of the type-2 memory card (according to the present invention).
FIG. 14 explains the input and output drivers provided at the connection terminals.

Next, the connection terminals of the memory card (type 2) according to the present invention will be explained referring to FIG. 13. This drawing lists the functions of the connection terminals of the type-2 memory card, namely, of the memory card according to the present invention. It should be noted that the type-2 memory card can used both the serial interface based on the three-wire half-duplex serial protocol and parallel interface based on the six-wire half-duplex parallel protocol. So, FIG. 13 show the functions according to each of these interface types.

The pin 1 (VSS terminal) is applied with a 0-V reference voltage (VSS). This VSS terminal connects the grounds of the host apparatus and memory card, respectively, to each other so that the 0-V reference voltages to the host apparatus and memory card, respectively, are the same as each other. The VSS terminal is used in common to both the serial and parallel interfaces and shows the same function for both the interfaces.

The pin 2 (BS terminal) is supplied with a bus-state signal from the host apparatus. This terminal is used in common for both the serial and parallel interfaces and shows the same function for both the interfaces.

When the pin 3 (DATA1 terminal) is used for the serial interface, it only causes the output driver to have a high impedance at the output thereof, that is, to have the output thereof opened. The pin 3 shows no special function in this. On the other hand, when this pin 3 is used for the parallel interface, it serves as an input/output terminal for data signal (DATA1) at lower two bits of 4-bit parallel data transferred between the memory card and host apparatus.

According the half-duplex protocol, two-way data communication is done over one line. So, for forming an interface circuit, an input drive 21 and output driver 22 will be connected to the input/output terminal (pin 3) as shown in FIG. 14. For output of data, only the output drive 22 is required, the input drive 21 not being necessary in any way. Since the input impedance of the driver is generally very high and so any transferred data will not specially be affected, the input driver 21 is left as it is. On the other hand, for entry of data, only the input driver 21 is required, the output driver 22 being not necessary in any way. However, if the output driver 22 is left as it is for entry of data, data transmitted over the line will possibly be influenced by a signal output from the output driver 22 and an impedance at the output of the output driver 22. Thus, generally, for an interface based on the half-duplex protocol, the pin 3 causes the output driver 22 to have a high impedance at the output thereof (the output is opened) for entry of data. Also in the interface according to the present invention, the pin 3 causes the output driver 22 to have a high impedance at the output thereof for entry of data. The pin 3 may cause, in any manner, the output driver 22 to have the high impedance at the output thereof. For example, a tri-state buffer as shown in FIG. 14 may be used or an opening/closing type switch may be used, to open the output of the output driver 22.

When used for an interface based on the serial protocol, the pin 3 causes, by the above function used for input and output of data, the output driver to have a high impedance at the output thereof. It should be noted that this is true for the pins 5 and 7 which will be described below.

The pin 4 (SDIO/DATA0 terminal) serves, when used for the serial interface, as an input/output terminal for serial data (SDIO) for transfer between the memory card and host apparatus. On the other hand, when used for the parallel interface, the pin 4 serves as an input/output terminal for data signal (DATA0) at LSB of 4-bit parallel data for transfer between the memory card and host apparatus.

The pin 5 (DATA2 terminal) causes, when used for the serial interface, the output driver to have a high impedance at the output thereof (namely, the output is opened). It shows no any special function in this case. On the other hand, when used for the parallel interface, the pin 5 serves as an input/output terminal for data signal (DATA2) at lower three bits of the 4-bit parallel data for transfer between the memory card and host apparatus.

The pin 6 (INS terminal) is used for the host apparatus to determine whether the memory card is inserted in the slot of the host apparatus or not. The INS terminal has the same construction as the INS terminal of the memory card of the type 1. Also, this pin 6 is commonly used for both the serial and parallel interfaces, and shows the same function for both the interfaces.

The pin 7 (DATA3 terminal) causes, when used for the serial interface, the output driver to have a high impedance at the output thereof (that is, the output is opened), and has no special function in this case. On the other hand, when used for the parallel interface, the pin 7 serves as an input/output terminal for data signal (3) at MSB of 4-bit parallel data for transfer between the memory card and host apparatus.

The pin 8 (SCLK terminal) is supplied with a clock signal from the host apparatus. This pin is used in common for both the serial and parallel interfaces, and shows the same function for both these interfaces.

The pin 9 (VCC terminal) is applied with a source voltage (VCC) from the host apparatus. This pin is used common for both the serial and parallel interfaces, and shows the same function for both these interfaces. The memory card can operate with a source voltage of 2.7 to 3.6 V, for example.

The pin 10 (VSS terminal) is applied with a 0-V reference voltage (VSS). It is internally connected to the pin 1. This terminals 10 is used in common for both the serial and parallel interfaces, and shows the same function for both these interfaces.

As seen from the comparison between the terminals of the type-1 memory card and the memory card (type 2) according to the present invention, the pin 1 (VSS terminal), pin 2 (BS terminal), pin 6 (INS terminal), pin 8 (SCLK terminal), pin 9 (VCC terminal) and pin 10 (VSS) are in common to the types 1 and 2.

In the type-2 memory card, when used for the serial interface, the pin 4 is used for a function of input/output of serial data signal, and when used for the parallel interface, it is used for a function of input/output of LSB of parallel data signal.

Thus, even when the memory card of the type 2 is inserted in the slot of the host apparatus supporting only the type-1 memory card, data can be transmitted between the host apparatus and the type-2 memory card via the serial interface. Also, even when the memory card of the type 1 is inserted in the slot of the type-2 host apparatus, data can be transmitted between the type-1 memory card and type-2 host apparatus via the serial interface.

As above, the terminals of the memory card and host apparatus, both of the type 1, are interchangeable with those of the memory card and host apparatus, both of the type 2, according to the present invention.

Note that the pin 3 in the type 1 is the VSS terminal while the pin 3 in the type 2 is the DATA 1 terminal but it can supply a power from the host apparatus to the memory card even when the type-1 memory card is inserted in the slot of the host apparatus of the type 2, since both the types 1 and 2 have the pin 9 (VCC terminal). On the contrary, even when the memory card of the type 2 is inserted in the slot of the host apparatus of the type 1, either the host apparatus nor the memory card will be specially affected since the pin 3 of the memory card will cause a high impedance when the terminal function of the memory card is set to the serial interface. Also, the pin 3 will cause, by a pull-down resistor (as in FIG. 14) provided directly thereon, a DC current from the source voltage (VCC), pull-down resistor to the ground (VSS). However, the DC current will not lead to any special problem when a switch is used to open the pull-down resistor or a sufficiently large pull-down resistance is provided, for example. Also, to deal with the DC current, the pin 3 may be opened at the host apparatus.

System Construction of the Interface Between the Memory Card and Host Apparatus

Figure 15:
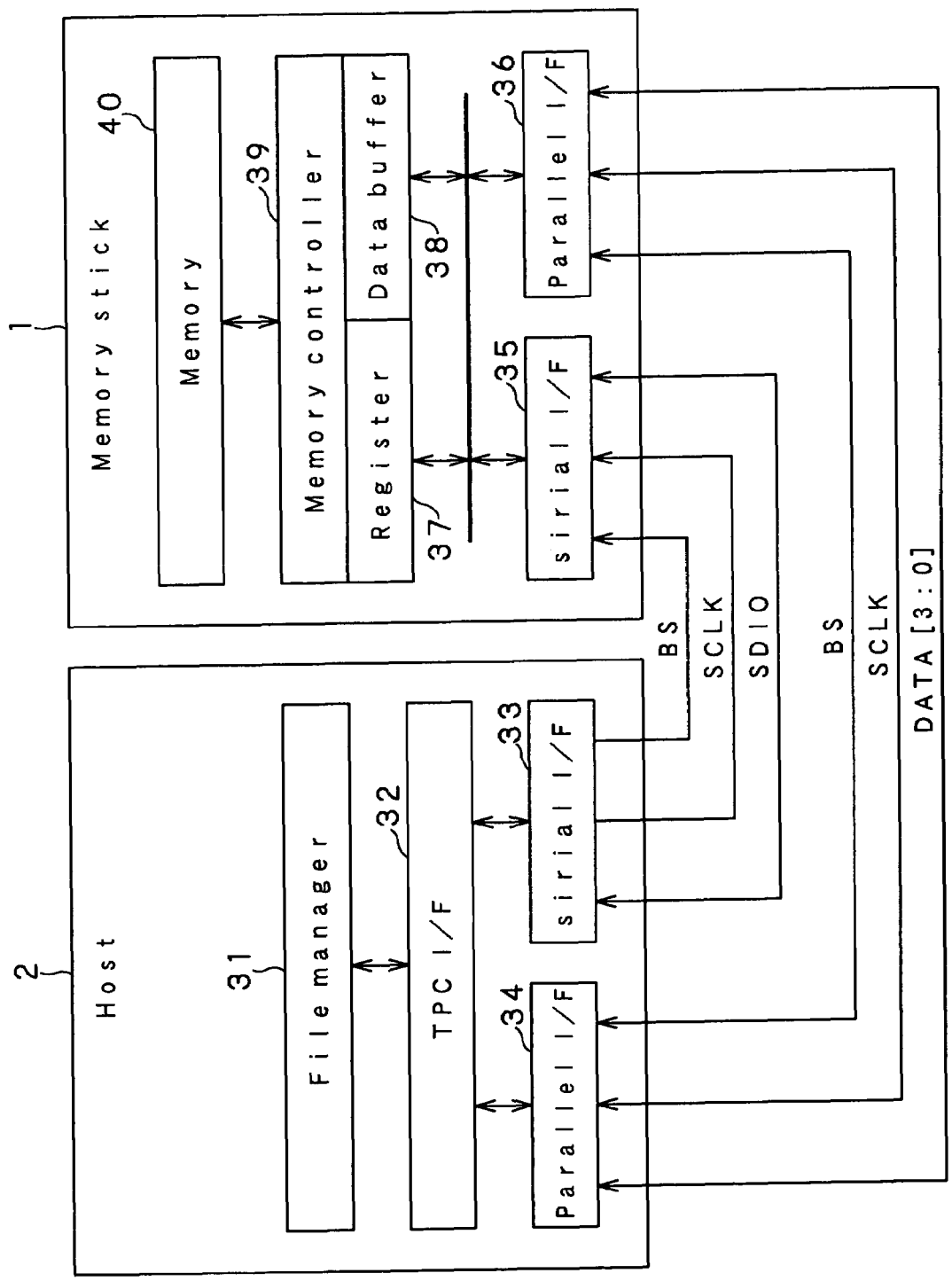
FIG. 15 explains the functions of an interface for data transfer between the memory card and host apparatus according to the present invention.

FIG. 15 explains the functions of an interface for data transfer between the memory card and host apparatus according to the present invention.

As shown, the host apparatus 2 is composed of a file manager 31, TPC interface 32, serial interface 33 and a parallel interface 34. Also, the memory card 1 is composed of a serial interface 35, parallel interface 36, register 37, data buffer 38, memory controller 39 and a memory 40.

The file manager 31 manages, in an operation system of the host apparatus, a file stored in the memory card 1 and a file stored in any other medium in the host apparatus.

The TPC interface 32 is a lower layer of the file manager 31. The TOC interface 32 accesses the resistor 37 and data buffer 38 in the memory card 1 according to a command (TPC: transfer protocol command) peculiar to the interface of the memory card 2.

The serial interfaces 33 and 35 are lower layers of the TPC interface and physical layers of the interface system. The serial interfaces 33 and 35 transfer data according to the three-wire half-duplex serial protocol intended for transfer of three signals including 1-bit serial data, clock and bus-state signal.

The parallel interfaces 34 and 36 are lower layers of the TPC interface, and physical layers of the interface system. The parallel interfaces 34 and 36 transfer data according to the six-wire half-duplex serial protocol intended for transfer of six signals including 4-bit parallel data, clock and bus-state signal.

The register 37 stores a command transferred from the host apparatus, internal state of the memory card, data address in the memory, various necessary parameters for execution of the command, file management information in the memory, etc.

The data buffer 38 temporarily stores or buffers data to be written to the memory 40 and data read from the memory 40.

The memory controller 39 controls data transfer between the data buffer 38 and memory 40 according to the command and various kinds of information stored in the register circuit 13 to write, read or erase the data.

The memory 40 provides a data storage area, and is virtualized as a unique model via the memory controller 39.

The host apparatus and memory card constructed as above can transfer data stored in any other medium managed by the file manager 31 to the memory 40 via the parallel or serial interface. Also, it can transfer data stored in the memory 40 to the other medium managed by the file manager 31 via the parallel or serial interface.

Also, the host apparatus and memory card constructed as above make a selection between the serial and parallel interfaces as follows:

For data transmission between the memory card and host apparatus, both the host apparatus and memory card will initially start operating with the serial interface when they are powered. Thus, even in case the host apparatus is of the type 1 while the memory card is of the type 2, for example, data transmission is possible between them. Also, even in case the host apparatus is of the type 2 while the memory card is of the type 1, data transmission is possible between them.

Next in case the host apparatus is of the type 1, the data communication will keep on by the serial interface.

On the contrary, when the host apparatus is of the type 2, the host apparatus 2 will determine whether the memory card inserted in the slot of the host apparatus is of the type 1 or 2. For this determination, a predetermined parameter of the memory card, stored in the memory, should be given a value which varies between the types 1 and 2, for example. By describing values of the predetermined parameter in the register, it is possible to send a TPC command for access from the host apparatus to any of the parameter values in the register, check that value and determine the type of the memory card inserted in the slot of the host apparatus.

When the memory card inserted in the host apparatus of the type 1, the host apparatus will continue the communication via the serial interface. In case the inserted memory card is of the type 2, the host apparatus will send a TPC command for switching of the interface to rewrite the predetermined parameter in the register 37. Once the value of the predetermined parameter in the register is rewritten, the host apparatus and memory card will start data transmission via the parallel interface.

Note that for switching the interface from parallel to serial, the host apparatus will send a predetermined TPC command again to rewrite the predetermined parameter to its initial value.

Also, it is possible to determine, by checking the voltage level at the pin 3 from the host apparatus, whether the inserted memory card is of the type 1 or 2.

When the memory card is determined to be of the type 1, the pin 3 has VCC applied thereto. Thus, when the voltage level at the pin 3 is High, it can be determined that the inserted memory card is of the type 1. When the memory card is determined to be of the type 2, the serial interface will be initialized, just after the power is switched on, and the pin 3 causes the output driver to have a high impedance at the output thereof (namely, the output is opened). Thus, when the memory card is of the type 2, the voltage level at the pin 3 will drop to the ground potential level through the pull-down resistor (as in FIG. 14). Therefore, when the voltage level at the pin 3 is Low, the inserted memory card can be determined to be of the type 2.

Serial Interface

Figure 16:
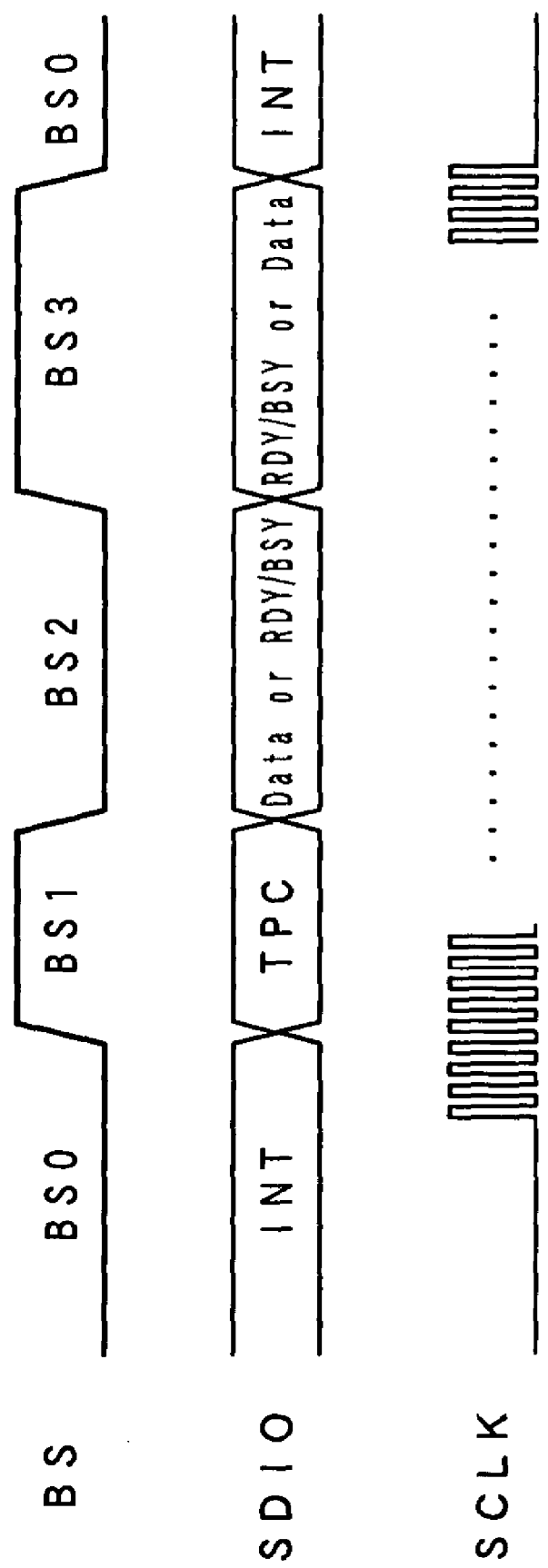
FIG. 16 explains a serial interface of the memory card according to the present invention.

The interface of the type-1 memory card and serial interface of the memory card of the type 2 (according to the present invention) transmits data according to the same three-wire half-duplex serial protocol. These serial interfaces will be explained below:

The serial interface connects the host apparatus and memory card by three signals including bus-state signal (BS), serial data signal (SDIO) and clock signal (SCLK) as shown in FIG. 16.

The serial data signal is to be transferred between the memory card and host apparatus. It will have the data transfer direction and attribute thereof changed according to a state defined by the bus-state signal.

The bus-state signal defines a state of serial data signal and a transfer start timing of the serial data signal in each such state. The bus-state signal is transferred from the host apparatus to the memory card. The state includes a total of four states: state (BS0) in which no packet communication is done and three states (BS1 to BS3) in which packet communication is being done. The bus-state signal switches the state from BS0 to BS3 in a timing of switching between High and Low.

The clock signal is for serial data signal and bus-state signal transferred on the bus. It is transferred from the host apparatus to the memory card. The clock signal is outputted whenever the state is any of the three states BS1 to BS3 (packet communication).

The content of communication in each of the states is as shown in FIG. 17.

The state BS0 is a state in which interrupt signal (INT signal) from the memory card to the host apparatus can be transferred to the serial data (SDIO) line but no packet communication being done. In the illustration, the signal level of a bus-state signal indicating the state BS0 is indicated with Low.

The state BS1 is a state in which a TPC command is transferred to the serial data (SDIO) line. The signal level of a bust-state signal indicating the state BS1 is indicated with High. The TPC command is transferred from the host apparatus to the memory card. The TPC command is required for the host apparatus to access the inside of the memory card. The TPC command includes three types: read/write of data to the data buffer, read/write of data to the register, and command to be given to the memory controller. The command to be given to the memory controller includes a flash control command and a function control command, for example. The flash control command is intended for direct access to the IC memory in the memory card. It includes a read command for reading data on a specified page in the memory to the data buffer, an erase command for erasure of data in a predetermined block in the memory, etc. Also, the function control command is intended for controlling each of the functions of the memory card. For example, the function control command includes a command for stopping a clock generator in the memory card, a command for clearing the data buffer, etc.

In the states BS2 and BS3, the serial data signal varies in attribute between a read protocol for transfer of data from the memory card to the host apparatus and a write protocol for transfer of data from the host apparatus to the memory card.

In the state BS2, busy (BSY) signal and read (RDY) signal are transferred to the serial data (SDIO) line when the read protocol is applied. That is, the read protocol allows data to be transferred from the memory card to the host apparatus according to a command from the host apparatus. When the memory card is not yet ready for the data transfer, the busy signal is sent from the memory card to the host apparatus. When the host apparatus is ready for the data transfer, the ready signal is sent from the memory card to the host apparatus.

In the state BS2, transfer data to be written and CRC (cyclic redundancy check code) for the transfer data are transferred from the host apparatus to the memory card over the serial data (SDIO) line when the write protocol is applied. In the state BS3, transfer data to be read and CRC for the transfer data are transferred from the memory card to the host apparatus on the serial data (SDIO) line when the read protocol is applied.

In the state BS3, busy signal and ready signal are transferred to the serial data (SDIO) line when the write protocol is applied. That is, when the write protocol is applied, data to be written is transferred along with a command from the host apparatus to the memory card. However, when the transfer data has not completely been processed, busy signal is sent from the memory card to the host apparatus. When the processing is complete, ready signal is sent from the memory card to the host apparatus.

In this serial interface, the states are managed as above. It should be noted that the interface takes the states BS1 to BS3 as one packet and one communication is completed with one packet unless any communication error takes place.

Timing of Signal Input/Output via the Serial Interface

The input/output timing for each signal via the serial interface will be described below:

In this serial interface, signal is inputted or outputted in a following timing.

(1) At the signal sending side, serial data signal is outputted at a trailing edge of a clock signal. At the signal receiving side, serial data signal is inputted at a leading edge of the clock signal.

(2) The host apparatus outputs a bus-state signal synchronously with the trailing edge of the clock signal. The memory card detects the bus-state signal at the leading edge of the clock signal. The host apparatus switches the bus-state signal to a new one synchronously with the timing of outputting LSB of last data in the serial data signal.

(3) Data transferred with serial data (SDIO) such as TPC, data and CRC are transferred starting with MSB.

Concrete examples of data transfer in the above input/output timing will be described below:

(Transfer of Data in BS1)

Figure 18:
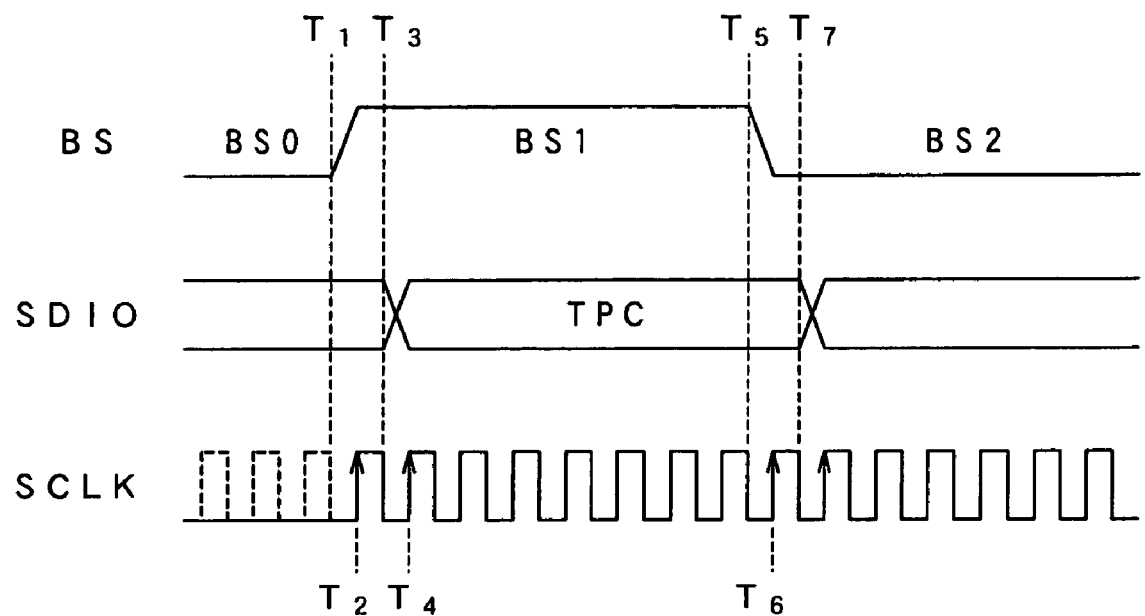
FIG. 18 explains the transfer of data in BS1 via the serial interface.

First, transfer of data in BS1 will be explained with reference to FIG. 18.

Timing at the Host Apparatus

At the host apparatus, a bus-state signal is made High at an arbitrary trailing edge (T1) of the clock signal.

Next, the host apparatus will start supplying a clock (SCLK) signal by a next leading edge (T2) of the clock signal.

Then, the host apparatus starts outputting a TPC at a next trailing edge (T3) of the clock signal. A TPC is outputted from MSB.

Further, the host apparatus switches the bus-state signal to Low at a trailing edge (T5) of the clock signal outputted from LSB of the TPC.

Then, the host apparatus will start outputting transfer data to be transmitted in BS2 at a next trailing edge (T7) of the clock signal. It should be noted that the transfer of data n BS1 is being described in the write packet communication but BSY/RDY signal will be inputted in the read packet communication.

Timing at the Memory Card

First, the memory card detects, in the timing (T2), that the bus-state signal is High, and receives MSB of the TPC at a next leading edge (T4) of the clock signal.

Next, the memory card will receive LSB of the TPC at a leading edge (T6) of the clock signal. Upon reception (at T6) of the TPC LSB, the memory card detects that the bus-state signal is Low.

Then, the memory card starts transfer of data BS2 at a next trailing edge (T7) of the clock signal.

(Transfer of Data in BS2)

Figure 19:
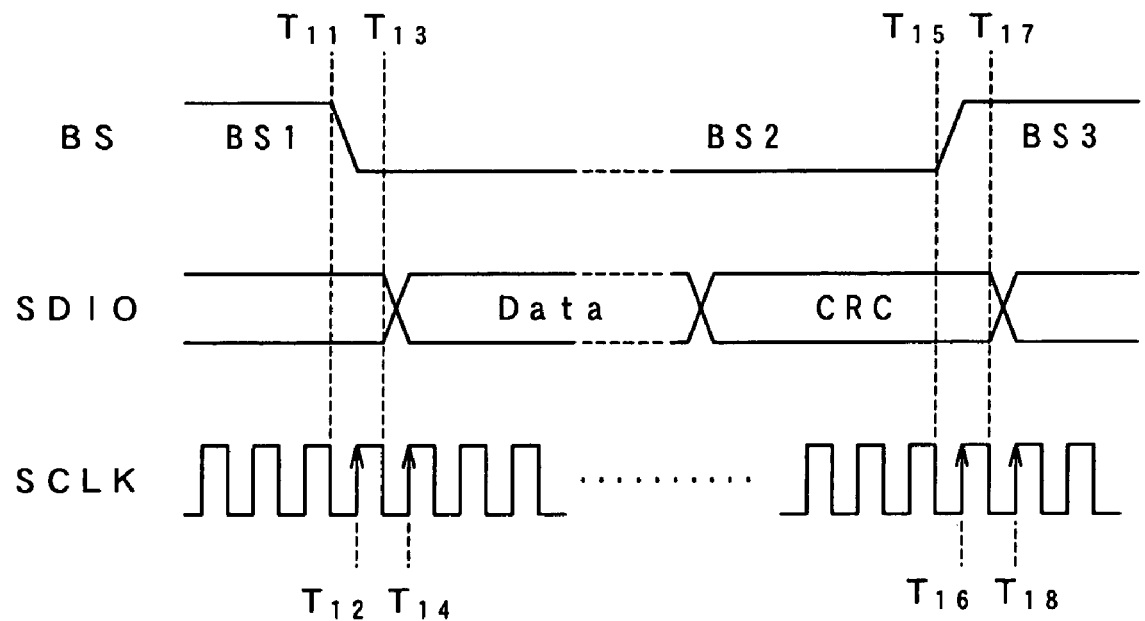
FIG. 19 explains the transfer of data in BS2 (write packet) via the serial interface.

Next, transfer of data in BS2 will be described with reference to FIG. 19.

Timing at the Host Apparatus

The host apparatus starts transferring data from MSB of leading data at a trailing edge (T13) one clock after a trailing edge (T11) at which the bus-state signal has been switched to Low.

Next, the host apparatus sends 16 bits of CRC after sending all transfer data.

Then, the host apparatus switches the bus-state signal to High at the trailing edge (T15) of the clock signal at which LSB of CRC is outputted.

Next, the host apparatus will start receiving BSY signal in BS3 at a leading edge (T18) of the clock signal one clock and a half after the timing (T15).

Timing at the Memory Card

The memory card will detect that the bus-state signal is Low, at a leading edge (T12) next to the timing (T11) in which the bus-state signal has been switched to Low.

Then, the memory card receives MSB of the transfer data at a next leading edge (T14).

Next, the memory card receives LSB of CRC at a leading edge (T16) next to the timing (T15). Upon reception (at T16) of the LSB of CRC, the memory card detects that the bus-state signal is High.

Then, the memory card starts outputting BSY signal in BS3 at a trailing edge (T17) next to the timing (T16).

Parallel Interface

Next, the parallel interface will be explained.

Figure 20:
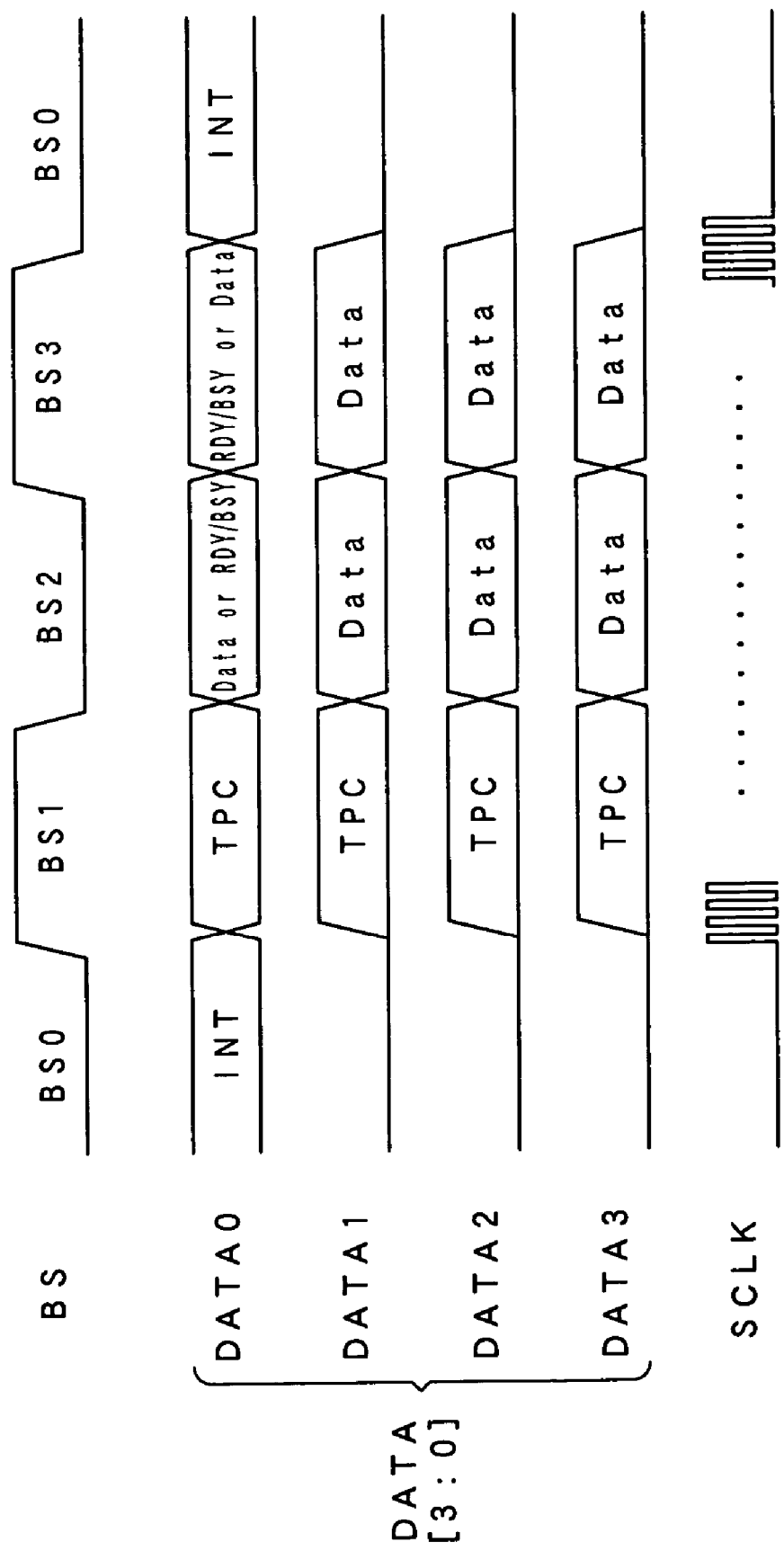
FIG. 20 explains a parallel interface of the memory card according to the present invention.

As shown in FIG. 20, the parallel interface connects the host apparatus and memory card to each other by six signals including bus-state signal (BS), four parallel data signals (DATA[3:0]) and clock signal (SCLK).

The parallel data signal is transferred between the memory card and host apparatus. It is transmitted in a width of 4 bits, and varies in data transfer direction and attribute between states defined by the bus-state signals.

The bus-state signal and clock signal are the same as in the serial interface.

The content of communication of data in each of the states is the same as that in the serial interface except that the BSY and RDY signals are transmitted to the DATA0 line used in common for the serial data signal.

Timing of Signal Input/Output via the Parallel Interface

The input/output timing for each signal via the parallel interface will be described below:

In the parallel interface, signal is inputted or outputted in a following timing:

(1) At the signal sending side, parallel data signal is outputted at a trailing edge of a clock signal. At the signal receiving side, parallel data signal is inputted at a trailing edge of the clock signal.

The serial interface operates for only a half period of the clock and the data transfer rate is limited to a half of the clock period. However, since the parallel interface operates for one period of the clock, a high-speed communication can be done via the parallel interface at a higher clock.

(2) Transfer data has eight-bit data (byte data) thereof divided by two into upper 4 bits and lower 4 bits to provide 4-bit parallel data. Further, the data at the upper 4 bits is first transferred and then data at the lower 4 bits is transferred.

(3) The host apparatus sets an output timing for parallel data signal and bus-state signal taking in account that the memory card inputs (latches) parallel data after a trailing edge of the clock signal.

(4) The host apparatus sets an input (latch) timing for the bus-state (BS)

signal taking in account that the memory card outputs parallel data after a trailing edge of the clock signal.

(5) The host apparatus switches the bus-state signal in a timing shown in

Figure 21:
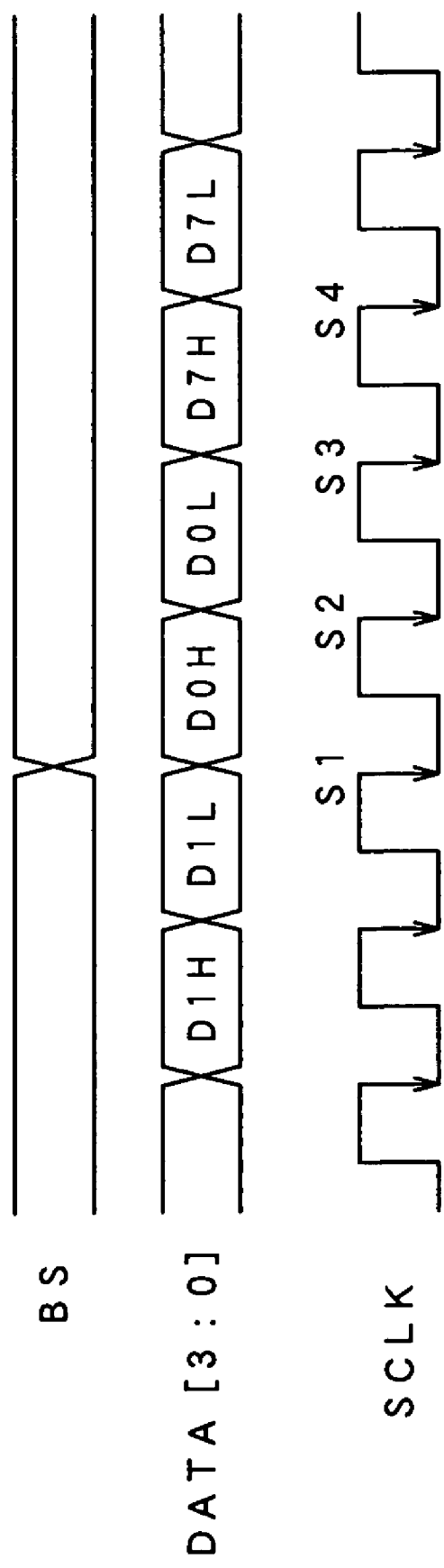
FIG. 21 explains a timing of bus-state switching with the parallel interface.

FIG. 21. More specifically, the bus-state signal switching is done so that the bus-state signal will be inputted (latched) in the same timing as the timing in which the upper 4 bits of the last byte in the preceding state are inputted (latched). It should be noted that in a timing S1 shown in FIG. 21, the bus state is switched and the upper 4 bits of the last byte are outputted. In a timing S2, the memory card detects the switching of the bus state, the upper 4 bits of the last byte are latched, and the lower 4 bits of the last byte are outputted. In a timing S3, the lower 4 bits of the last byte are outputted and the upper 4 bits of the leading byte are outputted. In a timing S4, the upper 4 bits of the last byte are latched and the lower 4 bits of the last byte are outputted.

(6) For switching the input/output direction of the parallel data, the output driver provided at each terminal for the parallel data signal is caused to have a high impedance at the output thereof for one clock at both the host apparatus and memory card (namely, the output is opened), and then data transfer is stared in a new direction.

With the above operations, no conflict will take place between data buses even if the output of the data output driver is controlled in a slightly wrong timing. Thus, it is possible to positively transmit data without having to control the timing strictly.

Concrete examples of the data transfer in the above-mentioned input/output timing will be described below:

Note that FIGS. 22 to 25 show a bus-state signal, clock signal and transfer data and also show a host-side enable signal (X0Ehost) and card-side enable signal (X0Ems). The enable signal (X0Ehost) for the host apparatus causes the output driver provided at each terminal of the host apparatus for parallel data (DATA[3:0]) to have a high impedance at the output thereof. Also, the enable signal (X0Ems) for the memory card causes the output driver provided at each terminal of the memory card for three parallel data (DATA [3:0]) to have a high impedance at the output thereof. When the bus-state signal is High, each of the enable signals causes the output driver to have a high impedance at the output thereof. When the bust-state signal is Low, the enable signal causes the output driver to have the output thereof enabled.

In FIGS. 22 to 25, "X" indicates an undefined value and "Z" indicates a high-impedance state.

(Transfer of Data in BS1)

Figure 22:
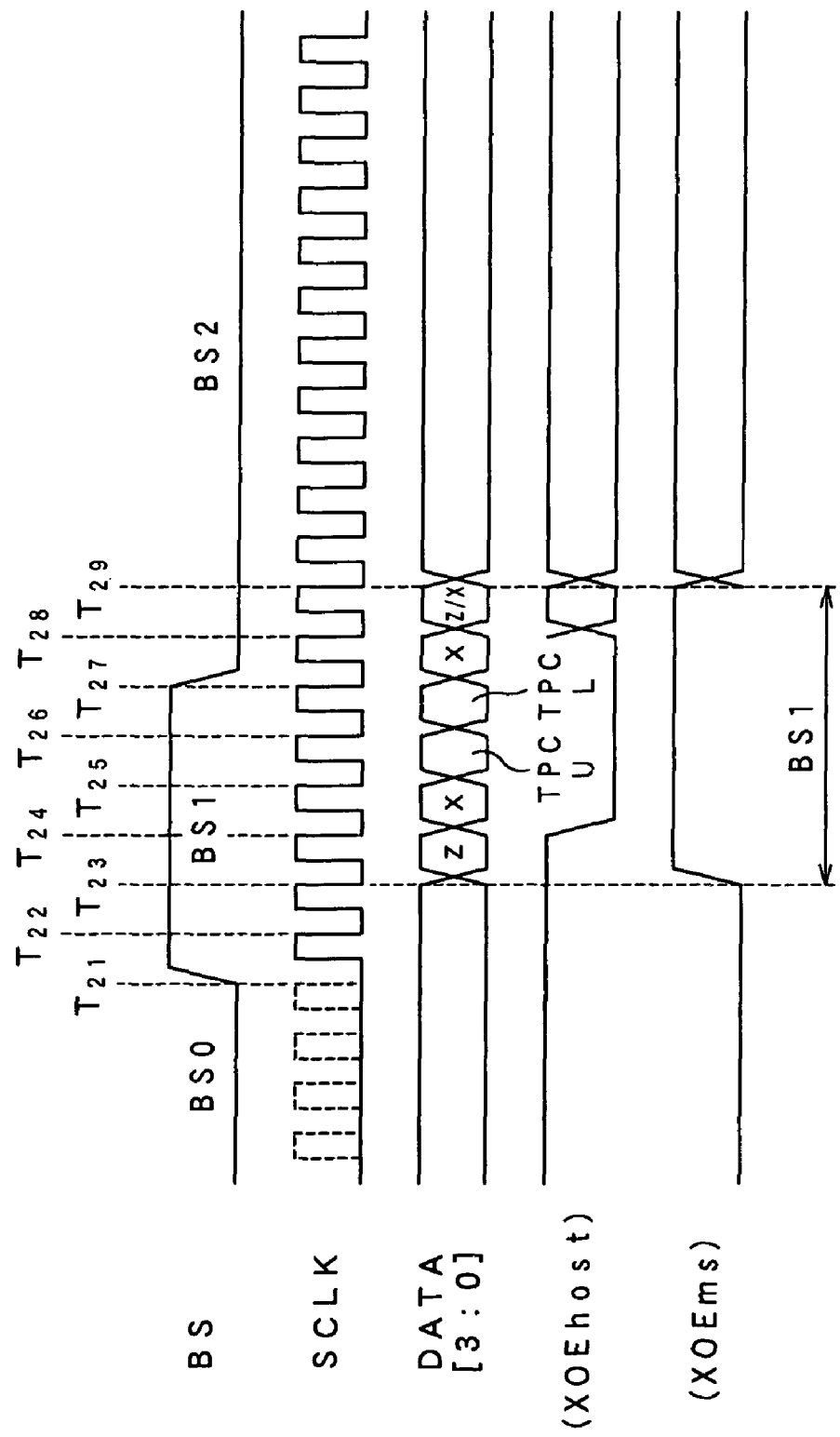
FIG. 22 explains the transfer of data (TPC transfer) in BS1 via the parallel interface.

Transfer of data in BS1 (transfer of TPC) will be described below with reference to FIG. 22.

Timing at the Host Apparatus

In the host apparatus, bus-state signal is made High at an arbitrary trailing edge (T21) of the clock signal.

Next, the host apparatus starts supplying the clock signal by a next trailing edge (T22) of the clock signal.

Then, the host apparatus starts transfer of data in BS1 for transfer at a next trailing edge (T23) of the clock signal.

Even after the transfer of data in BS1 is started, the host apparatus keeps the host-side enable signal (X0Ehost) High. At a next trailing edge (T24) of the clock signal, the host apparatus switches the host-side enable signal (X0Ehost) to Low. That is, the first bit after the transfer of data in BS1 is started causes the output driver for the parallel data signal to keep the high impedance at the output thereof, and the second and subsequent bits cause the parallel data output driver to have the output thereof enabled. It should be noted that the value of the parallel data transferred at the second bit after the transfer of data in BS1 is started is Low, which value is recognized by the memory card as an undefined one.

Next, the host apparatus starts sending upper 4 bits of TPC at a next trailing edge (T25) of the clock signal. Namely, upper 4 bits of the TPC are transferred at the third bit after the transfer of data in BS1 is started. It should be noted that TPC is 8-bit byte data.

Then, the host apparatus starts sending lower 4 bits of TPC at a next trailing edge (T26) of the clock signal. Namely, at the fourth bit after the transfer of data in BS1 is started, the host apparatus will send the lower 4 bits of TPC.

Next, the host apparatus switches the bus-state signal to Low at a next trailing edge (T27) of the clock signal. It should be noted that at the fifth bit after the transfer of data in BS1 is Low, which value will be recognized as an undefined value by the memory card.

Then, the host apparatus sends the undefined value at a next trailing edge (T28) of the clock signal or switches the host-side enable signal (X0Ehost) to High. That is, the sixth bit after the transfer of data in BS1 is started is an undefined value or causes a high impedance. The undefined value or high impedance is selected depending on whether the transferred TPC is a write command or a read command. In case the TPC is a write command, the sixth bit is Low without causing the high impedance and the memory card will recognize the sixth bit as an undefined value because the direction of data being transmitted will not be reversed in a next state (BS2). When the TPC is a lead command, the direction of the data being transmitted is reversed in the next state (BS2). That is, data is transmitted from the memory card to the host apparatus. Thus, the sixth bit causes the high impedance.

The host apparatus terminates the transfer of data in BS1 and starts transfer of data in BS2 which comes next, at a next trailing edge (T29).

Timing at the Memory Card

The memory card detects that the bus-state signal is High, in the above timing (T22).

Next, the memory card starts transfer of data in BS1 at a next trailing edge (T23) of the clock signal.

After starting the transfer of data in BS1, the memory card will first switch the card-side enable signal (XOEms) to High at the first leading edge (T23).

Then, the memory card disregards the data received in the timings (T24 and T25) because it causes a high impedance or is an undefined value. It should be noted that the memory card will disregard the data also in the subsequent timings (T28 and T29).

Next, the memory card receives data at upper 4 bits of TPC at a next trailing edge (T26) of the clock signal.

Next, the memory card receives data at lower 4 bits of TPC at a next trailing edge (T27) of the clock signal.

Then, the memory card will detect, at a next trailing edge (T28) of the clock signal, that the bus-state signal is Low.

Further, the memory card terminates the transfer of data in BS1 and starts transfer of data in BS2 which comes next, at a next trailing edge (T29) of the clock signal.

(Transfer of Data in BS2 for Write-Packet Communication)

Figure 23:
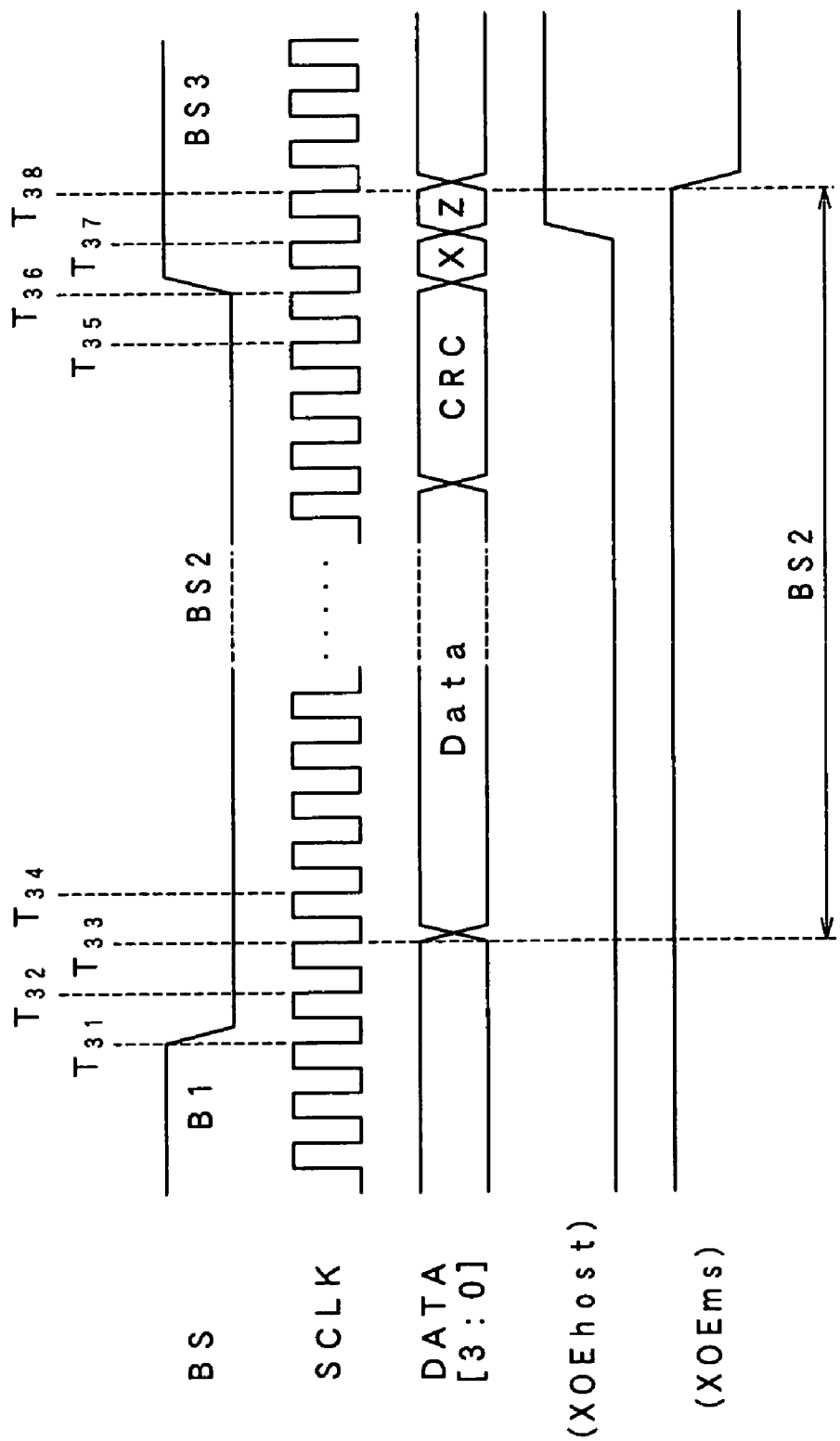
FIG. 23 explains the transfer of data in BS2 (write packet) via the parallel interface.

Transfer of data in BS2 by write-packet communication will be described below with reference to FIG. 23.

Timing at the Host Apparatus

The host apparatus switches the bus-state signal to Low at a predetermined trailing edge (T31) of the clock signal. The timing corresponds to that (T27) in FIG. 22.

The host apparatus will start transfer of data in BS2 at a trailing edge (T33) two clocks after the timing in which the bus-state signal has been switched to Low. It should be noted that the host-side enable signal (X0Ehost) is kept Low as in the transfer of data in BS1.

In the timing (T33) when the transfer of data in BS2 has been started, the host apparatus starts transferring data starting with upper 4 bits of the leading byte.

Next, after sending all the data, the host apparatus will send 16 bits of CRC. Then, the host apparatus switches the bus-state signal to High at a trailing edge (T36) of the clock signal, next to a timing (T35) in which last 4-bit data of CRC is outputted. It should be noted that the value of parallel data transferred at this time is a one by which the host apparatus is caused to output a Low bus-state signal and it is recognized by the host apparatus as an undefined value.

Next, the host apparatus switches the host-side enable signal (X0Ehost) to High at a next trailing edge (T37) of the clock signal. That is, the last bit of data in BS2 for write-packet communication causes a high impedance.

Then, the host apparatus will terminate the transfer of data in BS2 and start transfer of data in BS3 which comes next, at a next trailing edge (T38).

Timing at the Memory Card

The memory card detects, in a timing (T32), that the bus-state signal is Low.

Next, the memory card starts transfer of data in BS2 at a next trailing edge (T33) of the clock signal. It should be noted that the card-side enable signal (X0Ems) remains High as in the transfer of data in BS1.

Next, the memory card starts receiving transfer data at a next trailing edge (T34) of the clock signal at which the transfer of data in BS2 has been started.

Then, the memory card receives lower 4 bits of the last byte of CRC in a timing (T36) and then detects, at a next trailing edge (T37), that the bus-state signal is High.

Next, at a next trailing edge (T38), the memory card switches the card-side enable signal (X0Ems) to Low and starts outputting BSY signal in BS3.

(Transfer of Data in BS3 for Read-Packet Communication)

Figure 24:
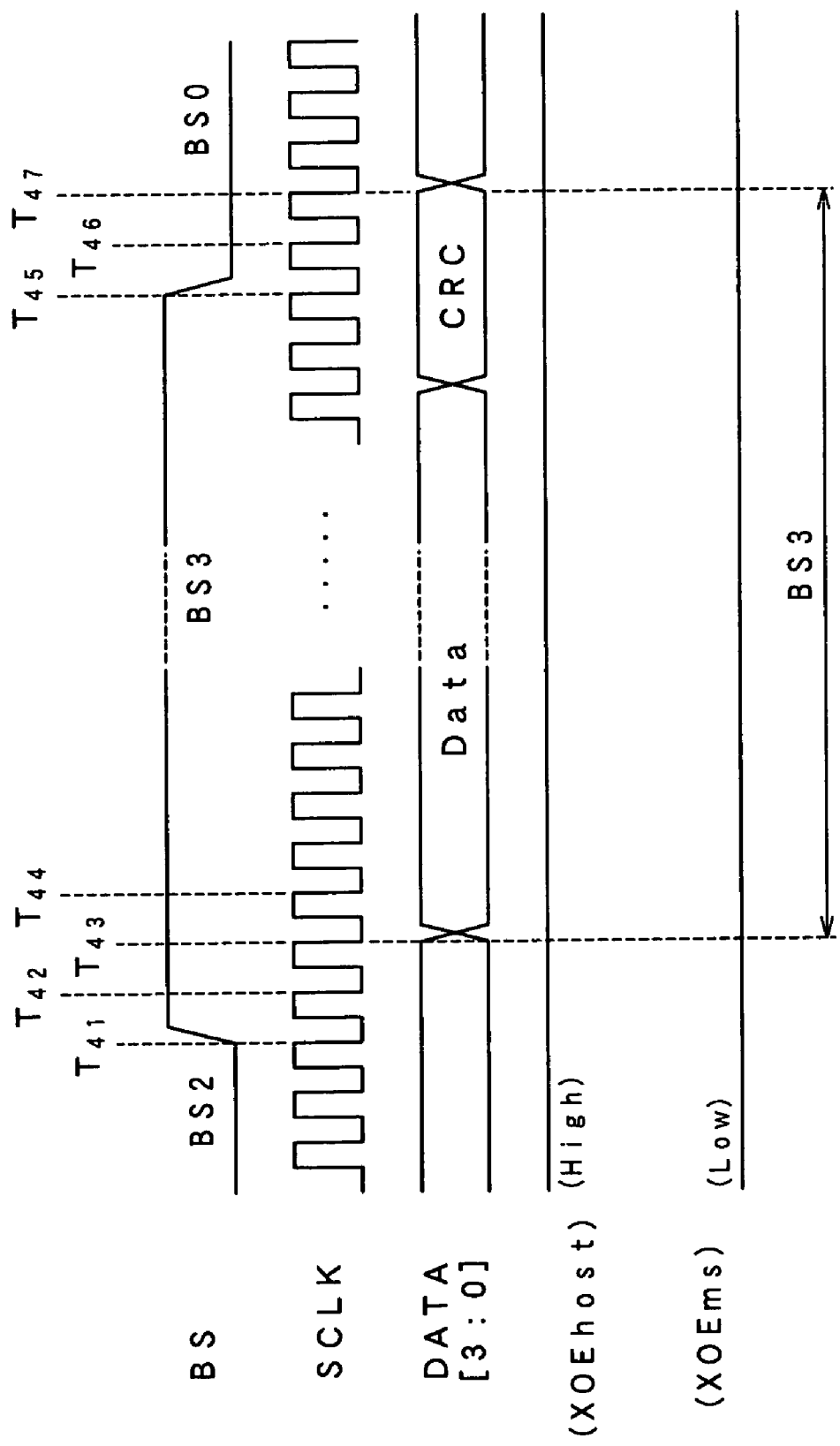
FIG. 24 explains the transfer of data in BS3 (read packet) via the parallel interface.

Transfer of data in BS3 (for read-packet communication) will be explained below with reference to FIG. 24.

Timing at the Host Apparatus

The host apparatus switches the bus-state signal to High at a predetermined trailing edge (T41) of the clock signal.

Next, the host apparatus starts transfer of data in BS3 at a trailing edge (T43) two clocks after the timing in which the bus-state signal has been switched to High. It should be noted that the host-side enable signal (X0Ehost) remains High as in the transfer of data in BS2.

Next, the host apparatus starts receiving transfer data at a next trailing edge (T44) of the clock signal, next to the timing (T43) in which the transfer of data in BS3 has been started.

Next, the host apparatus switches the bus-state signal to Low in a timing of receiving lower 4 bits of a byte preceding the last byte of CRC.

Then, after receiving the lower 4 bits of the last byte of CRC, the host apparatus will terminal the read-packet communication and start transfer of data in BS0 which comes next.

Timing at the Memory Card

The memory card detects, in a timing (T42), that the bus-state signal is High.

Next, the memory card start transfer of data in BS3 at a next trailing edge (T43) of the clock signal. It should be noted that the card-side enable signal (X0Ems) remains Low as in the transfer of data in BS2.

Next, in the timing (T43) in which the transfer of data in BS3 has been started, the memory card starts transferring data starting with the upper 4 bits of the leading byte.

Next, the memory card sends 16 bits of CRC after sending all the data.

Next, in the timing (T46) in which the lower 4 bit of the last byte of CRC has been outputted, the memory card detects that the bus-state signal is Low, terminates the transfer of data in BS3 an starts transfer of data in BS0 which comes next.

(Transmission of BSY and RDY Signals)

Figure 25:
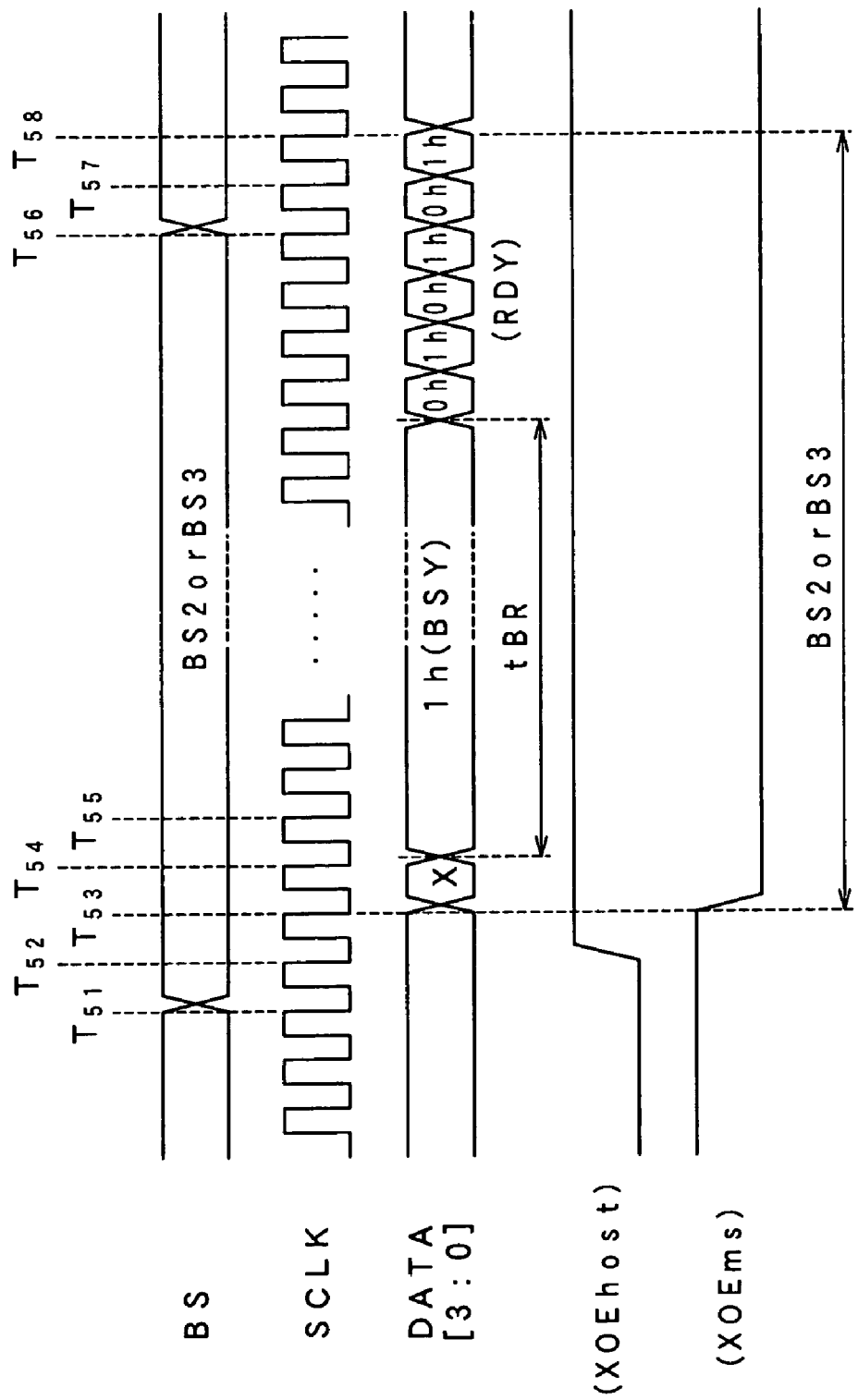
FIG. 25 explains the transfer of data in BS2 (read packet) and BS3 (write packet) via the parallel interface.

Transfer of data (busy and ready signals) in BS2 (for read-packet communication) and BS3 (for write-packet communication) will be described below with reference to FIG. 25.

Timing at the Host Apparatus

The host apparatus switches the bus-state signal to another level at a predetermined trailing edge (T51) of the clock signal. For the write-packet communication, the bus-state signal is switched to High (in timing T36 in FIG. 23). For the read-packet communication, the bus-state signal is switched to Low (in timing T27 in FIG. 22).

Next, the host apparatus switches the host-side enable signal (X0Ehost) to High at a trailing edge (T52) one clock after the timing in which the bus-state signal has been switched to another level).

Next, the host apparatus starts receiving BSY signal at a trailing edge (T55) three clocks after the timing (T52).

Next, the host apparatus will switch the bus-state signal to another level in a timing (T56) in which the toggled RDY signal repeatedly switched to High and Low at each clock has been detected for more than 4 clocks. For the write-packet communication, the bus-state signal is switched to Low, and for the read-packet communication, the bus-state signal is switched to High.

Then, the host apparatus starts transfer of data in next state (BS0 for the write-packet communication or BS3 for the read-packet communication) in a timing (T58) two clocks after the timing (T56).

Timing at the Memory Card

The memory card switches the card-side enable signal (X0Ems) to Low and simultaneously starts outputting BSY signal, at a trailing edge (T53) one clock, after the memory card detects the switched bus-state signal in the timing (T52).

Next, after completion of the internal processing, the memory card switches output signal from the BSY signal to the RDY signal.

Next, the memory card detects the switched bus-state signal in the timing (T57), and starts transfer of the data in BS0 (for the write-packet communication) or in BS3 (for the read-packet communication) at a trailing edge (T58) one clock after the detection of the switching of the bus-state signal.

Front-End Device of the Interface Circuit

Next, concrete examples of a front-end device of the interface between the memory card and host apparatus will be described.

Figure 26:
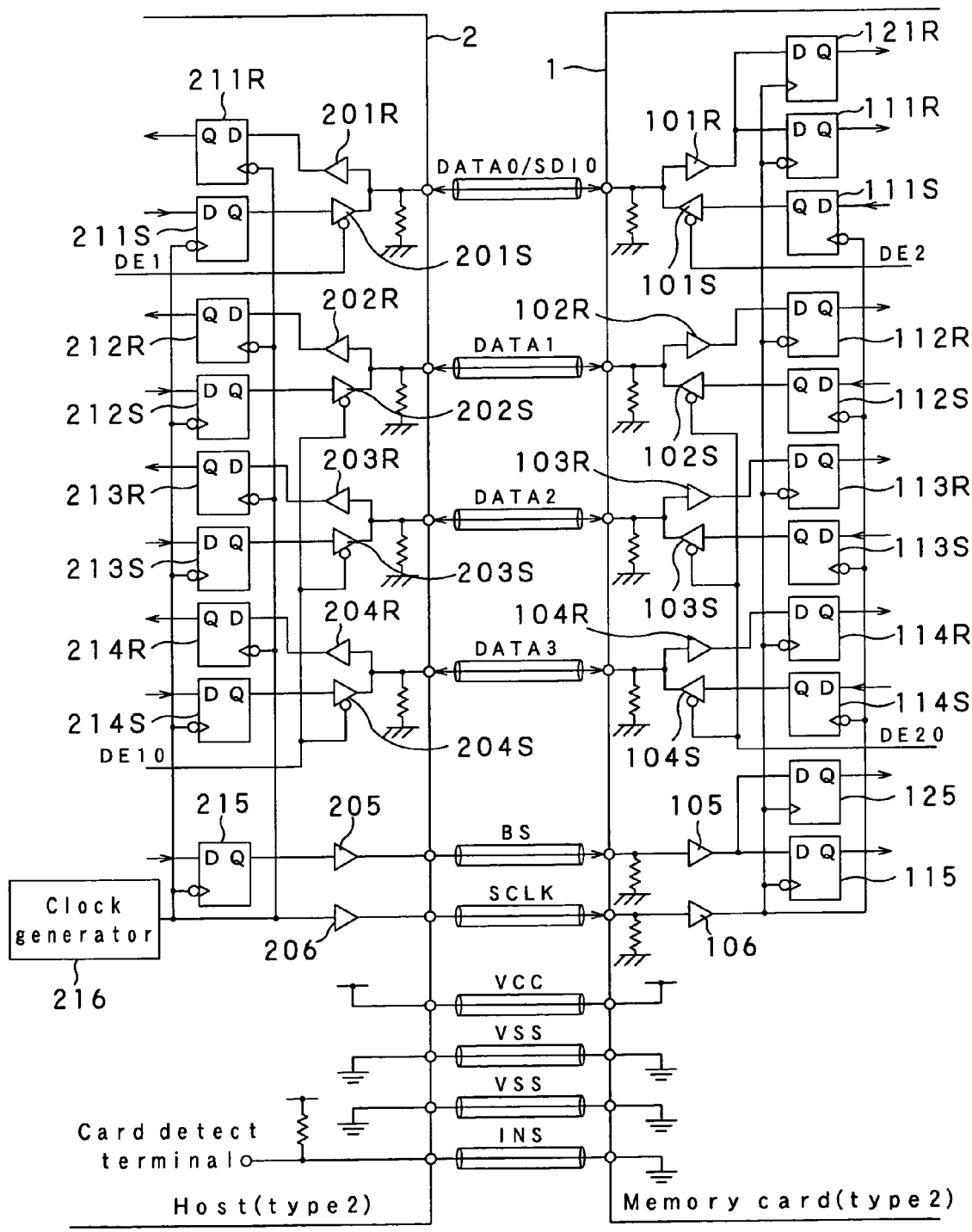
FIG. 26 shows the circuit construction of a front-end device of an interface between the type-2 memory card and host apparatus.

FIG. 26 shows the circuit construction of the front-end device of the interface between the type-2 memory card and host apparatus.

Circuit Construction of the Memory Card (of the Type 2)

The memory card 1 includes first to fourth data input buffers 101R to 104R, first to fourth data output buffers 101S to 104S, BS input buffer 105 and a CLK input buffer 106.

The first data input buffer 101R and first data output buffer 101S are provided as input and output drivers for the SDIO/DATA0 terminal. The second data input duffer 102R and second data output buffer 102S are provided as input and output drivers for the DATA1 terminal. The third data input buffer 103R and third data output buffer 103S are provided as input and output drivers for the DATA2 terminal. The fourth data input buffer 104R and fourth data output buffer 104S are provided as input and output drivers for the DATA3 terminal.

The BS input buffer 105 is provided as an input driver for the BS terminal.

The CLK input buffer 106 works as an input driver for the SCLK terminal.

Note that each of the first to fourth data output buffers 101S to 104S is a so-called tri-state buffer. The first data output buffer 101S is supplied with an enable signal DE2 as a control signal. When the enable signal DE2 is High, the first data output buffer 101S will have a high impedance at the output thereof. When the enable signal DE2 is Low, the first data output buffer 101S will have the output thereof enabled. Also, the second to fourth data output buffers 102S to 104S are supplied with an enable signal DE20 as a control signal. When the enable signal DE20 is High, the second to fourth data output buffers 102S to 104S will have a high impedance at the output thereof. When the enable signal DE20 is Low, the second to fourth data output buffers 102S to 104S will have the output thereof enabled. The enable signals DE2 and DE20 are outputted from a controller or the like (not shown).

The memory card 1 includes first to fourth data input flop-flops 111R to 114R, first to fourth data output flip-flops 111S to 114S, parallel BS input flip-flop 115, serial data input flip-flop 121R and a serial BS input flip-flop 125.

The first data input flip-flop 111R and first data output flip-flop 111S are provided as latch circuits for input and output data to and from the SDIO/DATA0 terminal. The second data input flip-flop 112R and second data output flip-fop 112S are provided as latch circuits for input and output data to and from the DATA1 terminal. The third data input flip-flop 113R and third data output flip-flop S113S are provided as latch circuits for input and output to and from the DATA2 terminal. The forth data input flip-flop 114R and fourth data output flip-flop 114S are provided as latch circuits for input and output data to and from the DATA3 terminal.

The BS input flip-flop 115 works as a latch circuit for input data to the BS terminal.

The serial data input flip-flop 121R works as a latch circuit for input data to the SDIO/DATA0 terminal when data is transmitted via the serial interface.

The serial BS input flip-flop 125 works as a latch circuit for input data to the BS terminal when data is transmitted via the serial interface.

The first to fourth data input flip-flops 111R to 114R are supplied with data from the first to fourth data input buffers 101R to 104R and output data to the controller or the like (not shown).

The first to fourth data output flip-flops 111S to 114S are supplied with data from the controller or the like (not shown) and output data to the first to fourth data output buffers 101S to 104 S.

The BS input flip-flop 115 is supplied with data from the BS input buffer 105 and output data to the controller or the like (not shown).

The serial data input flip-flop 121R is supplied with data from the first data input buffer 101R and outputs data to the controller or the like (not shown).

The serial BS input flip-fop 125 is supplied with data from the BS input buffer 105 and output data to the controller or the like (not shown).

Also, each of the above flip-flops is supplied with a clock signal supplied from the SCLK terminal.

Note here that the first to fourth data input flip-flops 111R to 114R, first to fourth data output flip-flops 111S to 114S and BS input flip-flop 115 operate synchronously with a trailing edge of the clock signal to latch the data.

The serial data input flip-flops 111R to 114R and serial BS input flip-flop 125 operate synchronously with a leading edge of the clock signal to latch the data.

Circuit Construction of the Type-2 Host Apparatus

The host apparatus 2 includes first to fourth input buffers 201R to 204R, first to fourth data output buffers 201S to 204S, BS output buffer 205 and a CLK output buffer 206.

The first data input buffer 201R and first data output buffer 201S are provided as input and output drivers for the SDIO/DATA0 terminal. The second data input buffer 202R and second data output buffer 202S are provided as input and output drivers for the DATA1 terminal. The third data input buffer 203R and third data output buffer 203S are provided as input and output drivers for the DATA2 terminal. The fourth data input buffer 204R and fourth data output buffer 204S are provided as input and output drivers for the DATA3 terminal.

The BS output buffer 205 works as an output driver for the BS terminal.

The CLK output buffer 206 is provided as an output driver for the SCLK terminal.

Note that each of the first to fourth data output buffers 201S to 204S is a so-called tri-state buffer. The first data output buffer 201S is supplied with an enable signal DE1 as a control signal. When the enable signal DE1 is High, the first data output buffer 201S will have a high impedance at the output thereof. When the enable signal DE1 is Low, the first data output buffer 201S will have the output thereof enabled. The second to fourth data output buffers 202S to 204S are supplied with an enable signal DE10 as a control signal. When the enable signal DE10 is High, these buffers 202S to 204S will have a high impedance at the output thereof. When the enable signal DE10 is Low, the buffers 202S to 204S will have the output thereof enabled. The enable signals DE1 and DE10 are outputted from the controller or the like (not shown).

The host apparatus 2 includes first to fourth data input flip-flops 211R to 214R, first to fourth data output flip-flops 211S to 214S, BS output flip-flop 215 and a clock generator 216.

The first data input flip-flop 211R and first data output flip-flop 211S are provided as latch circuits for input and output data to and from the SDIO/DATA0 terminal. The second data input flip-flop 212R and second data output flip-fop 212S are provided as latch circuits for input and output data to and from the DATA1 terminal. The third data input flip-flop 213R and third data output flip-flop 213S are provided as latch circuits for input and output to and from the DATA2 terminal. The forth data input flip-flop 214R and fourth data output flip-flop 214S are provided as latch circuits for input and output data to and from the DATA3 terminal.

The BS output flip-flop 215 works as a latch circuit for output data to the BS terminal.

The clock generator 216 generates a clock signal having a predetermined frequency (20 MHz, for example).

The first to fourth data input flip-flops 211R to 214R are supplied with data from the first to fourth data input buffers 201R to 204R, and output data to the controller or the like (not shown).

The first to fourth data output flip-flops 211S to 214S are supplied with data from the controller or the like (not shown), and output data to the first to fourth data output buffers 201S to 204 S.

The BS output flip-flop 215 is supplied with data from the controller or the like, and output data to the BS output buffer 205.

Also, each of the above flip-flops is supplied with a clock signal generated by the clock generator 216.

Note here that the first to fourth data input flip-flops 211R to 214R, first to fourth data output flip-flops 211S to 214S and BS output flip-flop 215 operate synchronously with a trailing edge of the clock signal to latch the data.

With the circuit construction of the front-end device, data can be transmitted between the memory card and host apparatus in a timing suitable for each of the above serial interface and parallel interface.

Parallel Data Communication

Next, parallel data transmission from the host apparatus 2 to the memory card 1 in the aforementioned front-end circuit will be explained.

First, the enable signals DE1 and DE10 at the host apparatus are Low while the enable signals DE2 and DE20 at the memory card are High. In this case, the host-side data output buffers 201S to 204S will have the output thereof enabled while the card-side data output buffers 101S to 104S will have a high impedance at the output thereof. Thus, parallel data signal (DATA3:0) will be transmitted from the host apparatus 2 to the memory card 1.

Parallel data signal is outputted from the host-side data output flip-flops 211S to 214S synchronously with a trailing edge of a clock signal. The parallel data signal outputted from the data output flip-flops 211S to 214S is supplied to the card-side data input flip-flops 111R to 114R via the data output buffers 201S to 204S, pins 4, 3, 5 and 7, and data input buffers 101R to 104R. The parallel data signal is supplied to the card-side data input flip-flops 111R to 114R synchronously with a trailing edge of the clock signal.

Note that at this time, the serial data input flip-flop 121R is not used.

Next, parallel data transmission from the memory card 1 to the host apparatus 2 will be described.

First, the enable signals DE1 and DE10 at the host apparatus are High while the enable signals DE2 and DE20 at the memory card are Low. In this case, the host-side data output buffers 201S to 204S will have a high impedance at the output thereof while the card-side data output buffers 101S to 104S will have the output thereof enabled. Thus, parallel signal (DATA3:0) will be transmitted from the memory card 1 to the host apparatus 2.

Parallel data signal is outputted from the card-side data output flip-flops 111S to 114S synchronously with a trailing edge of a clock signal. The parallel data signal outputted from the data output flip-flops 111S to 114S is supplied to the host-side data input flip-flops 211R to 214R via the data output buffers 101S to 104S, pins 4, 3, 5 and 7, and data input buffers 201R to 204R. The parallel data signal is supplied to the host-side data input flip-flops 211R to 214R synchronously with a trailing edge of the clock signal.

Note that the bus-state signal is transmitted from the host apparatus 2 to the memory card 1. That is, in this interface, the host apparatus 2 will have the initiative of the data communication.

The bus-state signal is outputted from the card-side BS output flip-flop 215 synchronously with a trailing edge of the clock signal. The bus-state signal output from the BS output flip-flop 215 is supplied to the card-side BS input flip-flop 115 via the BS output buffer 205, pin 2 and BS input buffer 105. The bus-state signal is supplied to the card-side BS input flip-flop 115 synchronously with a trailing edge of the clock signal.

It should be noted that at this time, the clock signal is generated by the clock generator 216 and supplied to each of the flip-flops at the host apparatus 2. Also, the clock signal is supplied to each of the flip-flops at the memory card 1 via the CLK output buffer 206, pin 8 and CLK input buffer 106.

Serial Data Communication

Next, serial data transmission from the host apparatus 2 to the memory card 1 in the aforementioned front-end circuit will be explained.

First, the enable signal DE1 at the host apparatus is Low while the enable signal DE2 at the memory card is High. In this case, the host-side data output buffer 201S will have the output thereof enabled while the card-side data output buffer 101S will have a high impedance at the output thereof. Thus, serial data signal (SDIO) will be transmitted from the host apparatus 2 to the memory card 1.

Also, the enable signal DE10 at the host apparatus and enable signal DE20 at the memory card are both High. In this case, the data output buffers 202S to 204S at the host apparatus and data output buffers 102S to 104S at the memory card have a high impedance at the output thereof. Thus, three parallel data signals other than the serial data signal (SDIO) will not be transmitted.

Serial data signal is outputted from the host-side data output flip-flop 211S synchronously with a trailing edge of a clock signal. The serial data signal output from the data output flip-flop 211S is supplied to the card-side serial data input flip-flop 121R via the data output buffer 201S, pin 4 and data input buffer 101R. The serial data signal is supplied to the card-side data input flip-flop 121R synchronously with a leading edge of the clock signal.

Note that at this time, the first to fourth data input flip-flops 111R to 114R will not be used.

Next, serial data transmission from the memory card 1 to the host apparatus 2 will be described.

First, the enable signals DE1 at the host apparatus is High while the enable signal DE2 at the memory card is Low. In this case, the host-side data output buffer 201S will have a high impedance at the output thereof while the card-side data output buffer 101S will have the output thereof enabled. Thus, serial data signal (SDIO) will be transmitted from the memory card 1 to the host apparatus 2.

Also, the enable signal DE10 at the host apparatus and enable signal DE20 at the memory card are both High. In this case, the data output buffers 202S to 204S at the host apparatus and data output buffers 102S to 104S at the memory card have a high impedance at the output thereof. Thus, three parallel data signals other than the serial data signal (SDIO) will not be transmitted.

Serial data signal is outputted from the card-side data output flip-flop 111S synchronously with a trailing edge of a clock signal. The serial data signal output from the data output flip-flop 111S is supplied to the host-side serial data input flip-flop 211R via the data output buffer 101S, pin 4 and data input buffer 201R. The serial data signal is supplied to the host-side data input flip-flop 211R synchronously with a trailing edge of the clock signal.

The bus-state signal is outputted from the host-side BS output flip-flop 215 synchronously with a trailing edge of the clock signal. The bus-state signal output from the BS output flip-flop 215 is supplied to the card-side BS input flip-flop 125 via the BS output buffer 205, pin 2 and BS input buffer 105. The bus-state signal is supplied to the card-side BS input flip-flop 125 synchronously with the leading edge of the clock signal. It should be noted that at this time, the card-side BS input flip-flop 115 is not used.

Connection Between Type-1 Host Apparatus and Type-2 Memory Card

Figure 27:
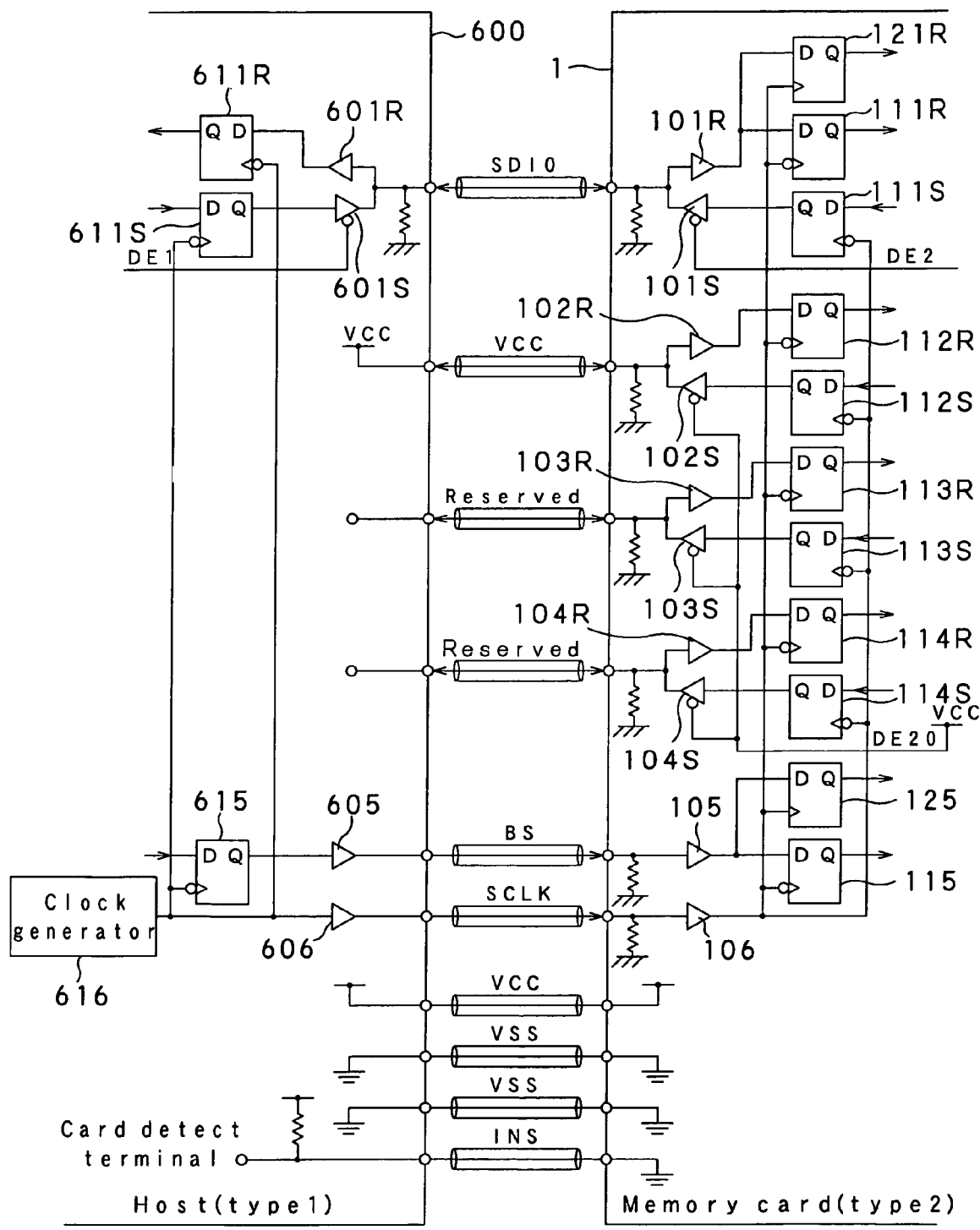
FIG. 27 shows the circuit construction of a front-end device of an interface between the type-2 memory card and type-1 host apparatus.

FIG. 27 shows the circuit construction of the front-end device of an interface between the type-2 memory card and type-1 host apparatus.

The type-2 memory card 1 is the same as in FIG. 26. Also, a type-1 host apparatus 600 shown in FIG. 27 is the same as in FIG. 2.

Because of a connection as shown FIG. 27, the memory card will have the same construction as that the type-1 memory card when the enable signal DE20 for the type-2 memory card is initially set to High.

Also, by using the card-side serial data input flip-flop 121R and first data output flip-flop 111S, a similar connection to that via the type-1 serial interface can be done.

Connection Between Type-2 Host Apparatus and Type-1 Memory Card

Figure 28:
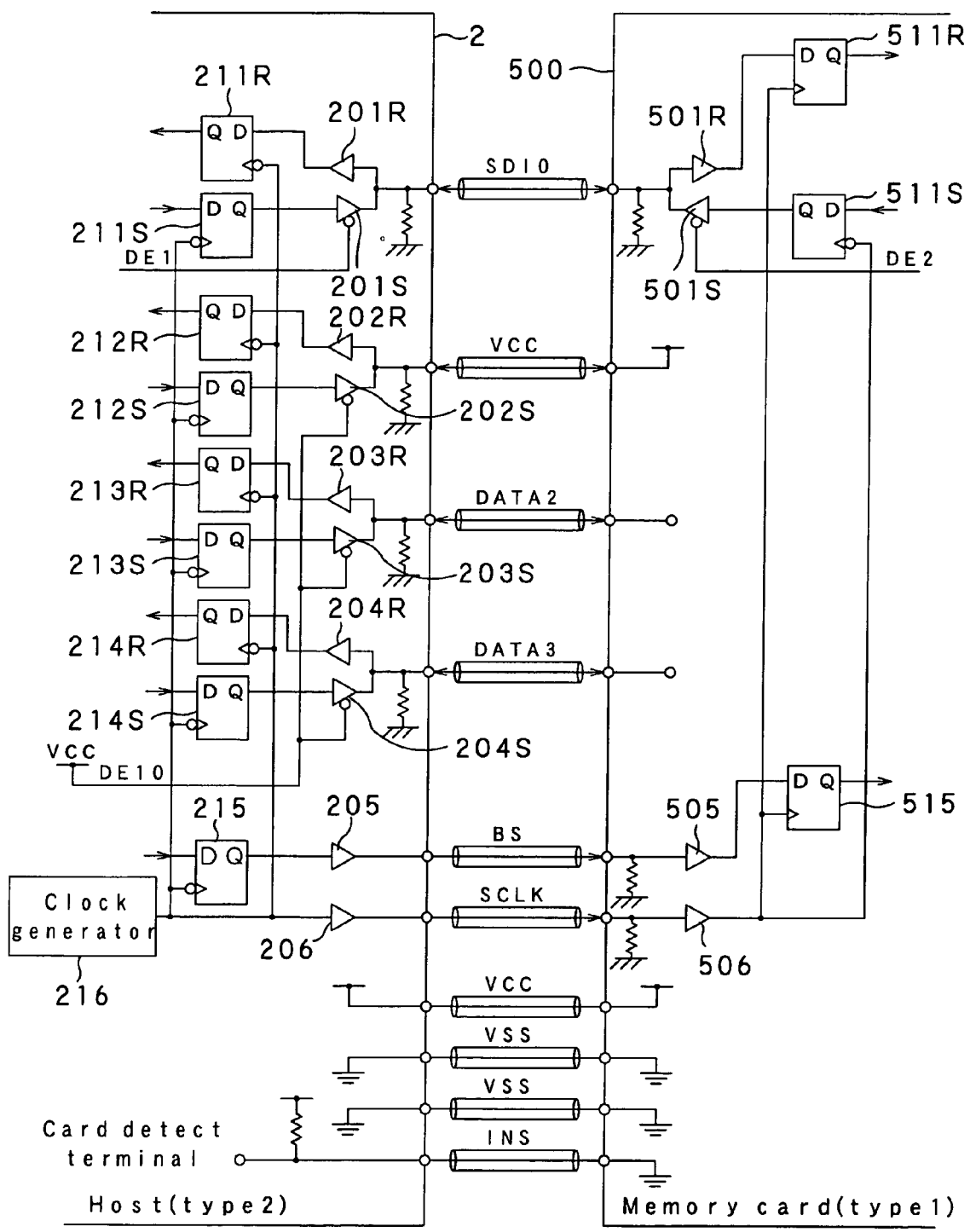
FIG. 28 shows the circuit construction of a front-end device of an interface between the type-1 memory card and type-2 host apparatus.

FIG. 28 shows the circuit construction of a front-end device of an interface between the type-1 memory card and type-2 host apparatus.

Figure 1:
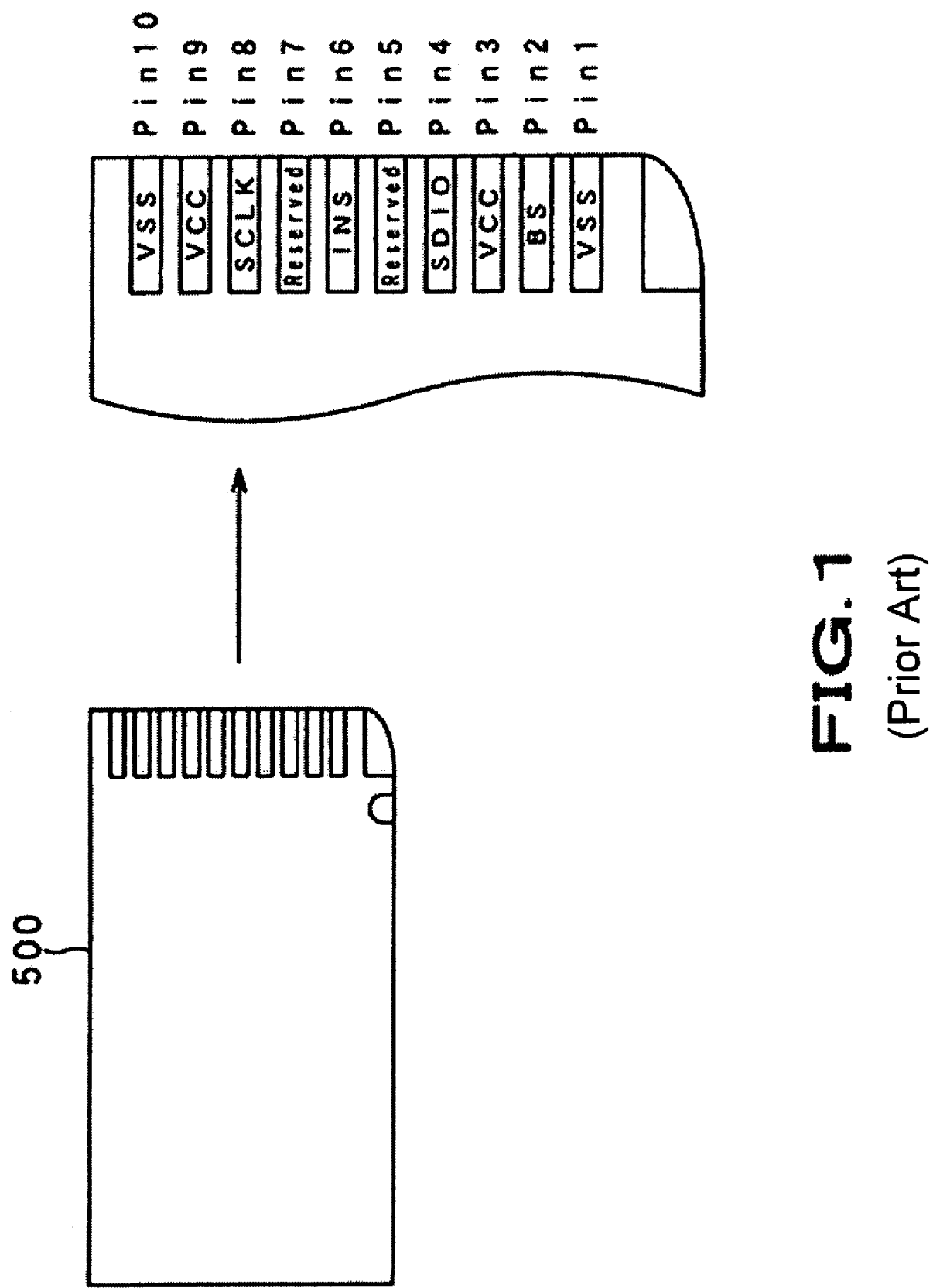
FIG. 1 shows the conventional memory card in the form of a schematic plan view and the terminal block of the memory card in an enlarged scale.
Figure 2:
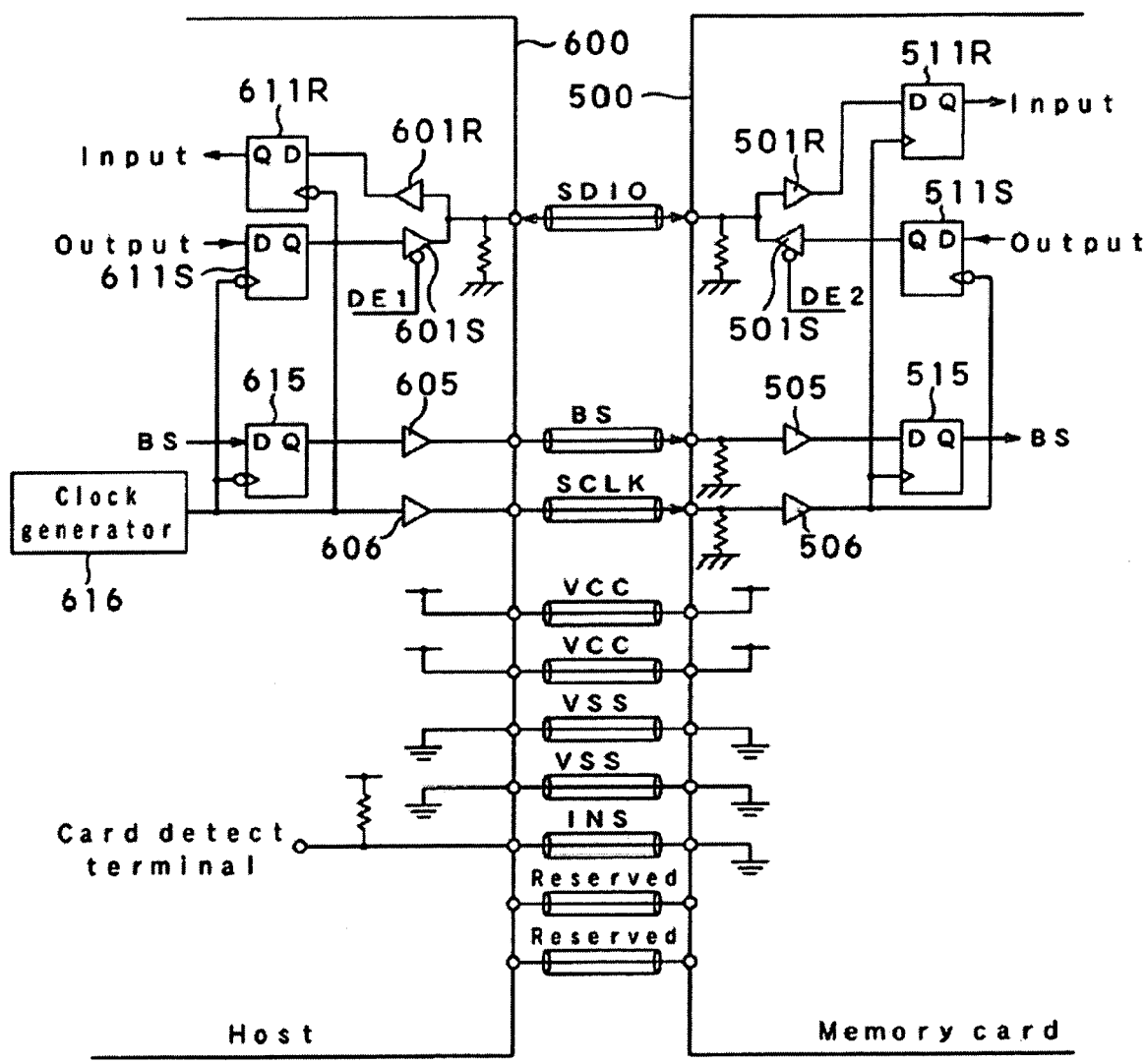
FIG. 2 shows the circuit construction of a front-end device of an interface between the conventional memory card and a host apparatus.
Figure 3:
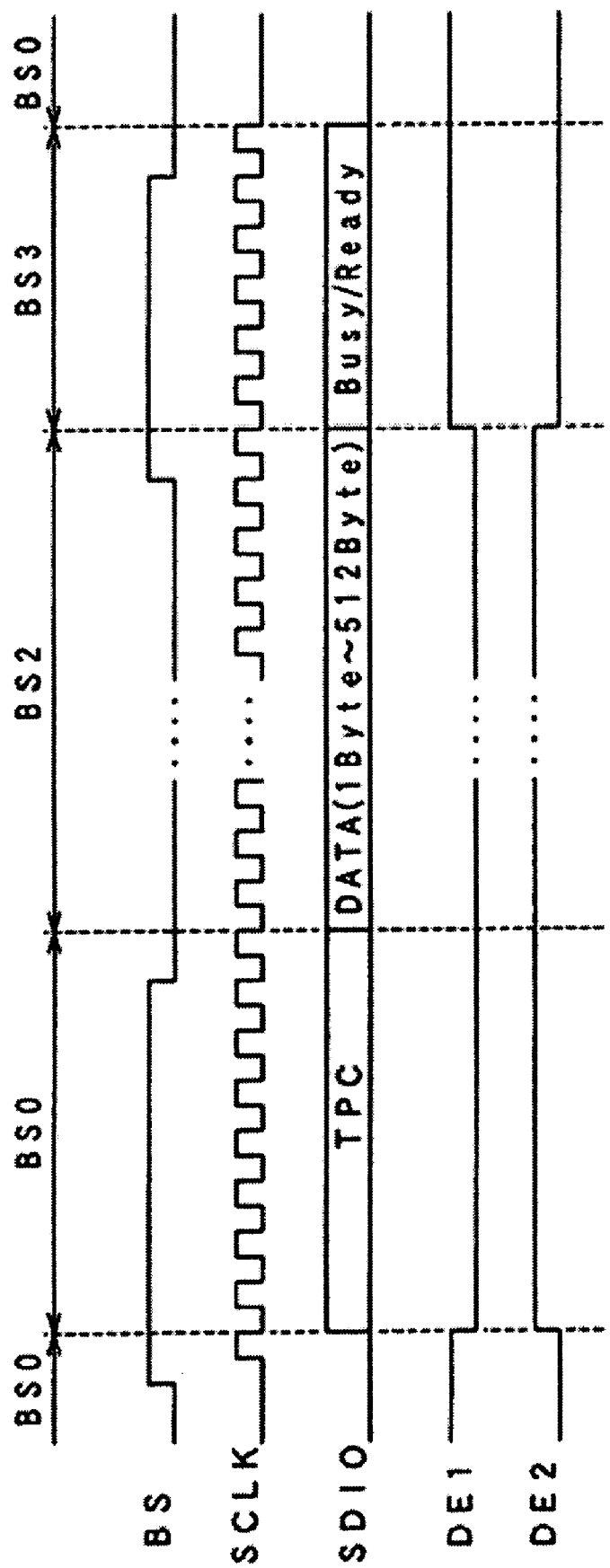
FIG. 3 explains the content of write-packet communication by the conventional memory card.
Figure 4:
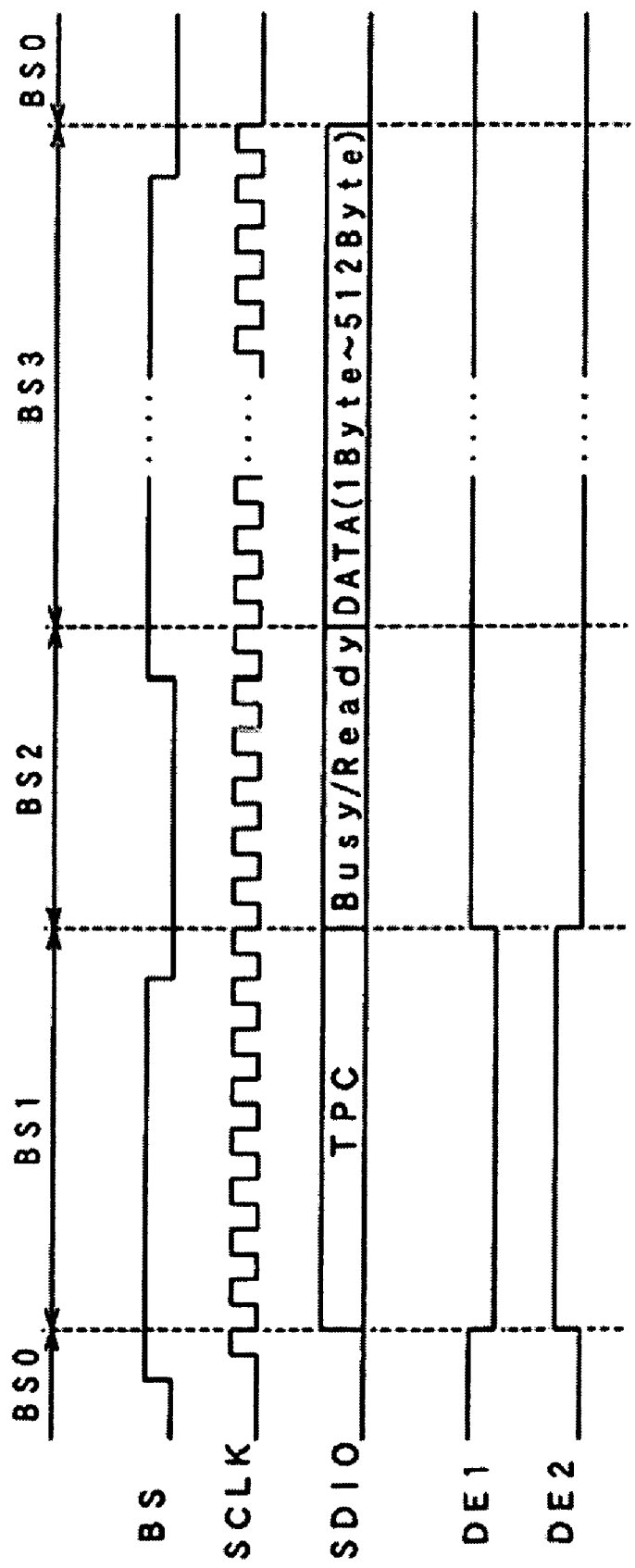
FIG. 4 explains the content of read-packet communication by the conventional memory card.
Figure 5:
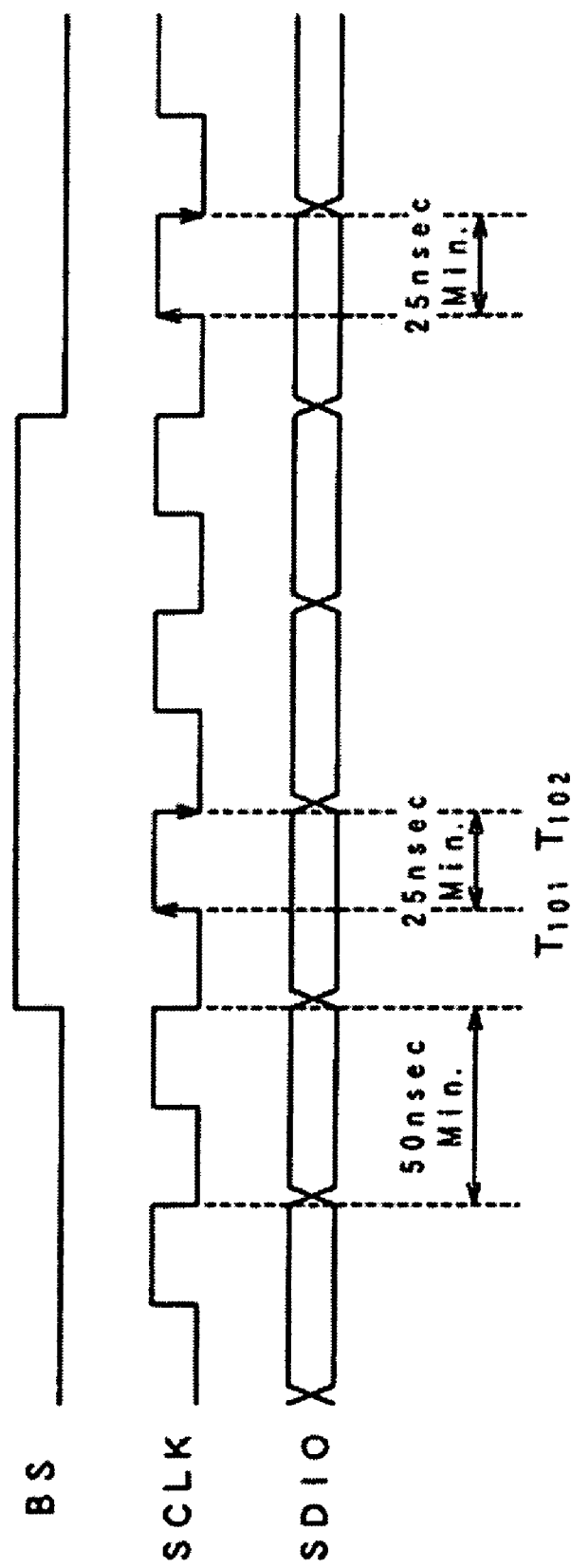
FIG. 5 explains a timing of bus-state switching with the interface of the conventional memory card.

A memory card 500 of the type 1 shown in FIG. 28 is the same as in FIG. 2. Also, the host apparatus 2 of the type 2 is the same as in FIG. 26.

Because of a connection as shown FIG. 27, the memory card will have the same construction as that the type-1 memory card when the enable signal DE10 for the type-2 host apparatus 2 is initially set to High.

Also, by using the host-side serial data input flip-flop 211R and first data output flip-flop 211S, a similar connection to that via the type-1 serial interface can be done.

In the foregoing, the removable small IC memory and data processing unit using the small IC memory as an external storage medium, according to the present invention, have been described. However, the interface device according to the present invention is not limited to any application to such a small IC memory. For example, the interface device according to the present invention is applicable to an externally connectable removable apparatus having any functions other than the IC memory, such as a camera module or the like in which a camera is connected to terminals at the opposite side to the terminal group.

Also, the small IC memory and data processing apparatus, having both functions of the parallel and serial interfaces, have been described as the embodiments of the present invention. However, they may be designed to have only the parallel interface.

INDUSTRIAL APPLICABILITY

The interface device according to the present invention makes data communications between an external apparatus and a host apparatus using 4-bit parallel data transferred over a two-way 4-bit parallel data communication line, a clock outputted from the host apparatus and bus-state signal indicating a state of the 4-bit parallel data communication line and transfer start timing.

Thus, the interface device according to the present invention permits to transmit data in a volume four times larger than, and at a higher data transfer rate than, in the conventional interface for the communication using 1-bit serial data, clock and bus-state signal.

Also, in the interface device according to the present invention, when 4-bit parallel data is supplied, the data output driver provided in the interface device for each of four data communication lines has the output thereof opened, and when input of the 4-bit parallel data is switched to output thereof, the data output driver in the interface device has the output thereof enabled after the data output driver at the counterpart has the output thereof opened for more than one clock.

Thus, in the interface device according to the present invention, even if the output of the data output driver is controlled in a slightly wrong timing, no conflict takes place between data buses. So, the interface device according to the present invention permits to transmit data positively without having to control the timing strictly.

Also, for input or output of 4-bit parallel data and bus-state signal, the interface device according to the present invention operates synchronously with either a leading or trailing edge of a clock.

Thus, the interface device according to the present invention can operate for one period of the clock and thus permits to transmit data at a higher speed with a faster clock. The conventional interface device operates only for a half of the clock and the data transfer rate is limited by a half of the period of the clock.

Also the interface device according to the present invention allows data communications between the external apparatus and host apparatus by a parallel communication using 4-bit parallel data two-way transmitted over the 4-bit parallel data communication lines, clock outputted from the host apparatus or a bus-state signal indicating a state of the 4-bit parallel data communication line and transfer start timing and a serial communication using 1-bit serial data, clock and bus-state signal, whichever is adaptively selected.

Thus, the present invention permits a higher-speed data communication while maintaining the exchangeability with an interface device for the serial communication using 1-bit serial data, clock and bus-state signal.

The invention claimed is:

1. A method of communicating with a host apparatus, the method comprising the steps of:
    inserting a removable external device into the host apparatus;
    communicating between the external device and the host apparatus with serial communication, communication lines between the external device and the host apparatus configured to communicate serial data communication over parallel communication lines;
    during the serial communication, sending a command to the external device for a first rewriting of a register value of the external device, the register value being changed from a value representing serial communication mode to parallel communication mode; and
    communicating between the external device and the host apparatus in parallel communication, after said first rewriting.

2. The method of communicating according to claim 1, further comprising the steps of:
    removing the external device capable of parallel and serial communication from the host apparatus;
    inserting an external device solely capable of serial communication into the host apparatus; and
    sending a command to the external device for a second rewriting the register value of the external device, the register value being changed from a value representing parallel communication to serial communication,
    wherein said first and second rewriting is performed by a predetermined command.

3. An interface device for an external device removably installable to a host apparatus, the interface device comprising:
    a data communication means for making two-way communication of 4-bit parallel data with the host apparatus over four data communication lines;
    a clock reception means for receiving a clock signal for the 4-bit parallel data from the host apparatus;
    a bus-state signal reception means for receiving, from the host apparatus, a bus-state signal indicating states of the 4-bit parallel data communication lines and transfer start timing;
    a control means for controlling the direction of transmitting the 4-bit parallel data according to content of a command received from the host apparatus and states, indicated by the bus-state signal, of the data communication lines; and
    command means for passing a command for access from the host apparatus to a register of the external device, for checking a predetermined parameter stored in the register, and for determining a type of the external device based on the predetermined parameter,
    wherein the predetermined parameter is configured to indicate whether communication between the host apparatus and the external device is a 4-bit parallel or 1-bit serial communication,
    the command means is configured to send a respective command to modify the predetermined parameter to indicate a change to 4-bit parallel communication during communication in 1-bit serial communication, after insertion of a respective external device capable of 4-bit parallel communication into the host apparatus,
    wherein the data communication means is configured to start communicating with 4-bit parallel data after the command means has modified the predetermined parameter to indicate a 4-bit parallel communication.

4. The interface device as set forth in claim 3, wherein the control means is operable to open, for input of the 4-bit parallel data, the output of a data output driver provided for each of the four data communication lines, and to enable, for switching the input of the 4-bit parallel data to the output thereof, the output of a data output driver of the external device after the output of a data output driver of the host apparatus has been opened for more than one clock cycle.

5. The interface device as set forth in claim 3, wherein the data communication means and bus-state signal reception means are enabled synchronously with either the leading or trailing edge of the clock signal.

6. The interface device of claim 3, wherein the command is a transfer protocol command.

7. The interface device according to claim 3, wherein, after insertion of the respective external device, the data communication means continues to communicate in 1-bit serial mode until the predetermined parameter is modified to indicate a change to 4-bit parallel communication.

8. The interface device according to claim 7, wherein, after replacement of the respective external device with an external device only capable of 1-bit serial communication, the predetermined parameter is modified to indicate a change to 1-bit parallel communication.

9. The interface device as set forth in claim 3, wherein the means for passing, checking and determining is further configured to set the remaining data communication lines not used for the 1-bit serial communication to high impedance.

10. An interface device for a host apparatus to which an external device is removably installable, the interface device comprising:
    a data communication means for making two-way communication of 4-bit parallel data with the host apparatus over four data communication lines;
    a clock sending means for sending a clock signal for the 4-bit parallel data to the external device;
    a bus-state signal sending means for sending, to the external device, a bus-state signal indicating states of the 4-bit parallel data communication lines and transfer start timing;
    a control means for controlling the direction of transmitting the 4-bit parallel data according to content of a command sent to the external device and states, indicated by the bus-state signal, of the data communication lines; and
    command means for passing a command for access from the host apparatus to a register of the external device, for checking a predetermined parameter stored in the register, and for determining a type of the external device based on the predetermined parameter
    wherein the predetermined parameter is configured to indicate whether communication between the host apparatus and the external device is a 4-bit parallel or 1-bit serial communication,
    the command means is configured to send a respective command to modify the predetermined parameter to indicate a change to 4-bit parallel communication during communication in 1-bit serial communication, after insertion of a respective external device capable of 4-bit parallel communication into the host apparatus,
    wherein the data communication means is configured to start communicating with 4-bit parallel data after the command means has modified the predetermined parameter to indicate a 4-bit parallel communication.

11. The interface device as set forth in claim 10, wherein the control means is operable to open, for input of the 4-bit parallel data, the output of a data output driver provided for each of the four data communication lines, and to enable, for switching the input of the 4-bit parallel data to the output thereof, the output of a data output driver of the host apparatus after the output of a data output driver provided in the external apparatus has been opened for more than one clock.

12. The interface device as set forth in claim 10, wherein the data communication means and bus-state signal reception means are enabled synchronously with either the leading or trailing edge of the clock signal.

13. The interface device as set forth in claim 10, wherein the means for passing, checking and determining is further configured to set the remaining data communication lines not used for the 1-bit serial communication to high impedance.

14. An interface device for an external device removably installable to a host apparatus, the interface device comprising:
   a serial data communication means for making two-way communication of 1-bit serial data with the host apparatus over one data communication line;
   a data communication means for making two-way communication of 4-bit parallel data with the host apparatus over four data communication lines;
   a clock reception means for receiving a clock signal for the 1-bit serial data or 4-bit parallel data from the host apparatus;
   a bus-state signal reception means for receiving, from the host apparatus, a bus-state signal indicating states of the 1-bit serial data or 4-bit parallel data communication lines and transfer start timing;
   a control means for controlling the direction of transmitting the 1-bit serial data or 4-bit parallel data according to content of a command received from the host apparatus and states, indicated by the bus-state signal, of the data communication lines;
   command means for passing a command for access from the host apparatus to a register of the external device, for checking a predetermined parameter stored in the register, and for determining a type of the external device based on the predetermined parameter; and
   a switching means for making a selection between the 1-bit serial and 4-bit parallel data communications based upon the type of external device;
   wherein the serial data communication means communicates with the host apparatus by sharing one of the four data communication lines over which the 4-bit parallel data is transferred;
   and wherein the predetermined parameter is configured to indicate whether communication between the host apparatus and the external device is a 4-bit parallel or 1-bit serial communication,
   the command means is configured to send a respective command to modify the predetermined parameter to indicate a change to 4-bit parallel communication during communication in 1-bit serial communication, after insertion of a respective external device capable of 4-bit parallel communication into the host apparatus,
   wherein the switching means is configured to switch from 1-bit serial communication to 4-bit parallel communication after the command means has modified the predetermined parameter to indicate a 4-bit parallel communication.

15. The interface device as set forth in claim 14, wherein the switching means opens, for the 1-bit serial data communication, the output of a data output driver provided for each of three data communication lines not used.

16. The interface device as set forth in claim 14, further comprising an information means to make the host apparatus recognize that the 4-bit parallel data communication can be done.

17. The interface device as set forth in claim 14, wherein the switching means is operable to:
   select the 1-bit serial data communication for an initial communication; and
   switch a communication mode from the 1-bit serial data communication to the 4-bit parallel data communication according to a switching command received from the host apparatus.

18. The interface device according to claim 14, wherein, after insertion of the respective external device, the data communication means continues to communicate in 1-bit serial mode until the predetermined parameter is modified to indicate a change to 4-bit parallel communication.

19. The interface device according to claim 18, wherein, after replacement of the respective external device with an external device only capable of 1-bit serial communication, the predetermined parameter is modified to indicate a change to 1-bit parallel communication.

20. An interface device for a host apparatus to which an external apparatus is removably installable, the interface device comprising:
   a serial data communication means for making two-way communication of 1-bit serial data with the external apparatus over one data communication line;
   a data communication means for making two-way communication of 4-bit parallel data with the host apparatus over four data communication lines;
   a clock sending means for sending a clock signal for the 1-bit serial data or 4-bit parallel data to the external apparatus;
   a bus-state signal sending means for sending, to the external apparatus, a bus-state signal indicating states of the 1-bit serial data or 4-bit parallel data communication lines and transfer start timing;
   a control means for controlling the direction of transmitting the 1-bit serial data or 4-bit parallel data according to content of a command sent to the external apparatus and states, indicated by the bus-state signal, of the data communication lines;
   command means for passing a command for access from the host apparatus to a register of the external device, for checking a predetermined parameter stored in the register, and for determining a type of the external device based on the predetermined parameter; and
   a switching means for making a selection between the 1-bit serial and 4-bit parallel data communications based upon the type of external device;
   wherein the serial data communication means performs the 1-bit serial data communications by sharing one of the four data communication lines over which the 4-bit parallel data is transferred;
   and wherein the predetermined parameter is configured to indicate whether communication between the host apparatus and the external device is a 4-bit parallel or 1-bit serial communication,
   the command means is configured to send a command to modify the predetermined parameter to indicate a change to 4-bit parallel communication during communication in 1-bit serial communication, after insertion of a respective external device capable of 4-bit parallel communication into the host apparatus, wherein the switching means is configured to switch from 1-bit serial communication to 4-bit parallel communication after the command means has modified the predetermined parameter to indicate a 4-bit parallel communication.

21. The interface device as set forth in claim 20, further comprising an insertion slot into which there can be inserted either:

a first external apparatus having an interface provided with:
  a data communication terminal for making two-way 1-bit serial data communication on the one data communication line;
  a clock reception terminal for receiving the clock signal for the 1-bit serial data; and
  a bus-state signal reception terminal for receiving a bus-state signal indicating the states of the 1-bit serial data communication bus and transfer start timing; or a second external apparatus having an interface provided with:
  four data communication terminals for making two-way 4-bit parallel data communication on the four data communication lines;
  a clock reception terminal for receiving the clock signal for the 4-bit parallel data; and
  a bus-state signal reception terminal for receiving a bus-state signal indicating the states of the four 4-bit parallel data communication lines and transfer start timing;

the insertion slot being provided with:
  four data terminals for connection of the four data communication terminals, respectively, of the second external apparatus to send and receive 4-bit parallel data to and from the second external apparatus;
  a clock sending terminal for connection to the clock reception terminal of either of the first or the second external apparatuses to send the clock signal;
  a bus-state signal sending terminal for connection of the bus-state signal reception terminal of either of the first or the second external apparatuses to send the bus-state signal; and
  when the first external apparatus is inserted in the insertion slot, a specific one of the four data terminals is connected with the data communication terminal of the first external apparatus to send and receive 1-bit serial data to and from the first external apparatus.

22. The interface device as set forth in claim 20, wherein the switching means opens, for the 1-bit serial data communication, the output of a data output driver provided for each of the three data communication lines that are not used.

23. The interface device as set forth in claim 20, wherein the switching means is operable to select the 1-bit serial data communication for an initial communication; and to send a switching command by the 1-bit serial data communication in order to switch a communication mode from the 1-bit serial data communication to the 4-bit parallel data communication.

* * * * *

UNITED STATES PATENT AND TRADEMARK OFFICE
CERTIFICATE OF CORRECTION

PATENT NO. : 7,277,973 B2  Page 1 of 1
APPLICATION NO. : 10/381311
DATED : October 2, 2007
INVENTOR(S) : Hideaki Bando It is certified that error appears in the above-identified patent and that said Letters Patent is hereby corrected as shown below:

On the Title Page of the patent, the title should read --INTERFACE DEVICE--;
In Column 1, the title should read --INTERFACE DEVICE--;
In Column 1, Line 23, "bust-state" should read --bus-state--;
In Column 2, Line 8, delete "since";
In Column 6, Lines 26 and 55, "then" should read --than--;
In Column 8, Line 14, "card detecting" should read --card-detecting--;
In Column 9, Line 31, delete "," after "interchangeable";
In Column 9, Line 32, insert "," after "with";
In Column 10, Line 56 "Information" should read --information--;
In Column 11, Line 40, "number" should read --numbered--;
In Column 12, Line 31, "used" should read --use--;
In Column 13, Line 62, "terminals" should read --terminal--;
In Column 16, Line 49, "bust-state" should read --bus-state--;
In Column 22, Line 56, delete --)-- after "level";
In Column 25, Line 20, "forth" should read --fourth--;
In Column 28, Lines 26, 43, and 51, "to transmit" should read --transmitting of--;
In Column 29, Line 26, insert --of-- after "rewriting"; and
In Column 29, Line 29, "is" should read --are--.

Signed and Sealed this

Twenty-ninth Day of April, 2008

JON W. DUDAS
*Director of the United States Patent and Trademark Office*